US010943251B2

(12) United States Patent
Clark

(10) Patent No.: US 10,943,251 B2
(45) Date of Patent: Mar. 9, 2021

(54) METHOD AND SYSTEM FOR REAL-TIME REBATE APPLICATION

(71) Applicant: MasterCard International Incorporated, Purchase, NY (US)

(72) Inventor: Kyle Patrick Clark, High Ridge, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 793 days.

(21) Appl. No.: 15/091,720

(22) Filed: Apr. 6, 2016

(65) Prior Publication Data

US 2017/0293932 A1 Oct. 12, 2017

(51) Int. Cl.

| | |
|---|---|
| ***G06Q 30/02*** | (2012.01) |
| ***G06Q 20/38*** | (2012.01) |
| ***G06Q 20/34*** | (2012.01) |
| ***G06Q 20/20*** | (2012.01) |
| ***G06Q 20/12*** | (2012.01) |
| ***G06Q 20/10*** | (2012.01) |
| ***H04L 29/08*** | (2006.01) |

(52) U.S. Cl.

CPC ......... *G06Q 30/0234* (2013.01); *G06Q 20/10* (2013.01); *G06Q 20/12* (2013.01); *G06Q 20/204* (2013.01); *G06Q 20/34* (2013.01); *G06Q 20/387* (2013.01); *G06Q 20/3825* (2013.01); *H04L 67/306* (2013.01)

(58) Field of Classification Search

CPC .. G06Q 30/0234; G06Q 20/387; G06Q 20/34; G06Q 20/3825; G06Q 20/204; G06Q 20/12; G06Q 20/4016; G06Q 20/10; H04L 67/306

See application file for complete search history.

(56) References Cited

U.S. PATENT DOCUMENTS 6,138,911 A * 10/2000 Fredregill ............ G06Q 20/342 235/380
2005/0165617 A1* 7/2005 Patterson ................ G06F 3/065 705/59

(Continued)

FOREIGN PATENT DOCUMENTS

WO 20100135642 A2 11/2010
WO 2016028889 A1 2/2016

OTHER PUBLICATIONS

International Search Report and Written Opinion issued by the International Search Authority dated Mar. 23, 2017 in corresponding PCT Application No. PCT/US2017/017786 (13 pages).

(Continued)

*Primary Examiner* — Sam Refai
*Assistant Examiner* — Kyle G Robinson
(74) *Attorney, Agent, or Firm* — Buchanan Ingersoll & Rooney PC

(57) ABSTRACT

A method for real-time processing of a rebate is described. The method includes receiving a transaction message that includes a primary account number, a transaction amount, and a transaction identifier; receiving a rebate request including the transaction identifier; identifying a financial institution associated with a transaction account corresponding to the primary account number, generating a data message including a rebate request; and electronically transmitting the data message.

20 Claims, 14 Drawing Sheets

(56) References Cited

U.S. PATENT DOCUMENTS

| | | | | |
|---|---|---|---|---|
| 2008/0183480 | A1* | 7/2008 | Carlson | H04M 15/851 705/1.1 |
| 2009/0319352 | A1* | 12/2009 | Boyle | G06Q 30/00 705/14.15 |
| 2010/0274655 | A1* | 10/2010 | Postrel | G06Q 30/0233 705/14.27 |
| 2013/0254008 | A1* | 9/2013 | Ovick | G06Q 30/0225 705/14.26 |
| 2015/0120429 | A1* | 4/2015 | Salmon | G06Q 20/387 705/14.33 |
| 2016/0098739 | A1* | 4/2016 | Bowman | G06Q 30/0226 705/14.18 |
| 2016/0171202 | A1* | 6/2016 | Goad | H04L 63/0442 726/5 |

OTHER PUBLICATIONS

International Preliminary Report on Patentability with Written Opinion (Forms PCT/IB/336, PCT/IB/373 and PCT/ISA/237) dated Oct. 18, 2018, by the International Bureau of WIPO in corresponding International Application No. PCT/US2017/017786. (9 pages).

* cited by examiner

METHOD AND SYSTEM FOR REAL-TIME REBATE APPLICATION

FIELD

The present disclosure relates to a method and system for real-time promotions, for instance, applying points instead of spending cash for a transaction in a real-time fashion.

BACKGROUND

Currently, financial institutions may provide loyalty programs to incentivize the cardholders to participate in certain purchase activities. The loyalty programs may include providing rebates, or credit points, for certain types of transactions. For example, a credit card issuer may provide cash rebates, or equivalent points, when the card holder uses the corresponding credit card to purchase electronics from certain merchants, e.g., Amazon®. The cardholder may use the cash rebates or points for future purchases.

When the cardholder uses the rebates or points for the future purchases, conventional loyalty programs have one or more drawbacks or limitations. For example, the conventional loyalty programs may remind the cardholder of available rebates or points prior to the purchases, but cannot reward the cardholder immediately after the transactions.

Further, the redemption model for the rebate or points of the conventional loyalty programs also creates difficulties for the cardholders as the redemption model requires the cardholders to wait until the purchases are posted on their accounts to login to the system of the loyalty program to redeem the rebates or the points. The redemption model, thus, results in days of delay and required activity for the cardholder to receive the benefit of the rebates or points. Additionally, the computer systems involved have to deal with multiple contacts, multiple authentications, auditing and tracking as well as reconciliation and other functions that are costly with respect to computer processing and communications, as well as affecting scalability.

Additionally, the conventional loyalty programs generally operate as enterprise products of the respective financial institutions. To the perception of the present inventors, universal program support is desired.

Moreover, the conventional loyalty programs may implement solutions that prompt the cardholder to redeem the rebates or points at a point of sale. However, such solutions might require the merchants to upgrade the devices or programming of pre-existing devices in their stores and to train their staff on new procedures that might be different for different rewards or promotional programs. In other solutions where a cardholder may be issued a second payment card (e.g., a pre-paid card or virtual card) linked to his/her rewards balance, the second payment card requiring the cardholder to track and redeem the rewards through a separate card mechanism. This too is computationally complicated, involving many different and additional communications, and issuance, tracking, processing and settling the second payment card.

As such, there is a need for a technical solution to provide a method and system for real-time rewards for transactions.

SUMMARY

The present disclosure provides a description of systems and methods for real-time promotions. The systems and methods may be implemented to real-time process a rebate.

For example, a method for real-time processing of a rebate may include receiving, by a receiving device of a processing server, a transaction message via a payment network, wherein the transaction message is formatted based on one or more standards and includes at least a plurality of data elements including at least a first data element configured to store a primary account number, a second data element configured to store a transaction amount, and one or more additional data elements configured to store additional transaction data including at least a transaction identifier; receiving, by the receiving device of the processing server, a data signal superimposed with a rebate request, wherein the rebate request includes at least the transaction identifier; identifying, by a data identification module of the processing server, a financial institution associated with a transaction account corresponding to the primary account number based on at least one of: the primary account number and the additional transaction data included in the received transaction message; generating, by a generation module of the processing server, a data message comprising a rebate request, wherein the rebate request includes at least the primary account number and the transaction amount included in the received transaction message; and electronically transmitting, by a transmitting device of the processing server, the generated data message to the identified financial institution via the payment network.

Further, the method may be embodied in a system for real-time processing of a rebate, comprising: a receiving device of a processing server configured to receive a transaction message via a payment network, wherein the transaction message is formatted based on one or more standards and includes at least a plurality of data elements including at least a first data element configured to store a primary account number, a second data element configured to store a transaction amount, and one or more additional data elements configured to store additional transaction data including at least a transaction identifier, and a data signal superimposed with a rebate request, wherein the rebate request includes at least the transaction identifier; a data identification module of the processing server configured to identify a financial institution associated with a transaction account corresponding to the primary account number based on at least one of: the primary account number and the additional transaction data included in the received transaction message; a generation module of the processing server configured to generate a data message comprising a rebate request, wherein the rebate request includes at least the primary account number and the transaction amount included in the received transaction message; and a transmitting device of the processing server configured to electronically transmit the generated data message to the identified financial institution via the payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
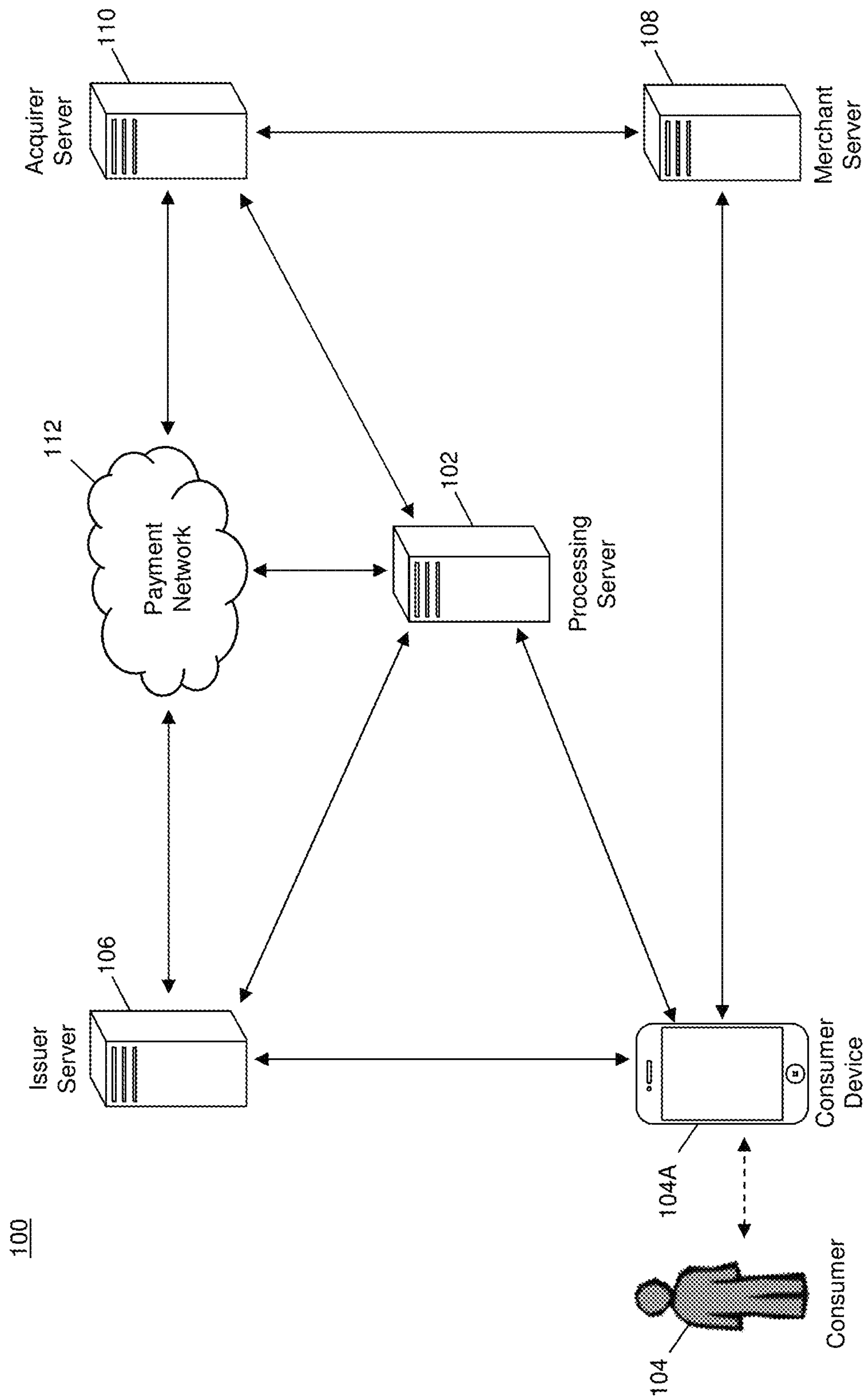
FIG. 1 is a block diagram illustrating a high level system architecture for providing real-time rewards in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards (e.g., credit cards, prepaid cards, debit cards, merchant cards, chip and pin cards, payment credentials on mobile devices that may employ near-field communication (NFC), physical and virtual cards, etc.), letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Providing Real-Time Rewards

FIG. 1 is a block diagram illustrating a high level system architecture for providing real-time rewards in accordance with exemplary embodiments.

System 100 may include a processing server 102 configured to provide real-time rewards to a consumer 104 via a consumer device 104A. As depicted in greater detail with respect to FIG. 13, consumer 104 may conduct a payment transaction using his or her payment card with a merchant. In a simplified example for payment transactions, consumer 104 via consumer device 104A (e.g., smartphones, tablets, laptops, desktop computers, etc., or nearly any electronic computer that can be specifically configured through construction and/or programming to carry out the functions disclosed herein) may initiate a transaction request using a payment card as the funding source and providing identification information of the goods or services, for which consumer 104 intends to pay, to a merchant server 108. Merchant server 108, upon receiving the transaction request and the identification information of the goods or services, may transmit data signals to an acquirer server 110. Acquirer server 110 may be configured to generate an authorization request based on the received transaction request and identification information of the payment card and may transmit the authorization request, via a payment network 112, to a server of a financial institution that issued (e.g., established an account and issued a payment card to access the account) the payment card to consumer 104 (e.g., issuer server 106). If this process, as described in detail with respect to FIG. 13, results in an authorization for the payment transaction to be charged to the payment card (e.g., merchant server 108 receives approval signals from payment network 112), the merchant may complete the payment transaction and provide the goods or services to consumer 104.

As described above, the financial institution that provides the payment card may implement loyalty programs for cardholders, e.g., consumer 104. As an example of the loyalty programs, the financial institution may provide a portion of the transaction amount, or equivalent points, as rebates to the cardholder for future purchases. In a more specific example, Chase® may implement a loyal program that allows the cardholder to receive rebates or points worthy of 5% of the transaction amount from every purchase transaction of home appliances made by the cardholder. The cardholder may use the rebates or points for subsequent purchases of the same or other types of goods or services.

In some examples, conventional loyalty programs may remind the cardholder of the availability of the rebates via e-mail, short message service (SMS), push notification such as alerts on apps on smartphones and other electronic devices, etc., or nearly any other form of communication, prior to a current transaction such that the cardholder may choose to use the available rebates generated from previous transactions. Unlike conventional loyalty programs, processing server 102 may receive the data associated with the current transaction ("transaction data" hereinafter) when acquirer server 110 generates the authorization request and may determine the eligibility of the current transaction for applying rebates. If processing server 102 determines that the current transaction is eligible for applying rebates and the cardholder's account has sufficient rebates, processing server 102 may instruct acquirer server 110 to apply the previously received rebates and instruct issuer server 106 to immediately refund the credits or cash used in the current transaction. Thus, the balance of the cardholder's account may not be substantially affected by the current transaction due to the immediate refund. The immediate refund process is described in greater detail in accordance with FIG. 3 and FIG. 8.

In some other examples, conventional loyalty programs may require the cardholder wait until the current transaction is posted to the account of the cardholder. The cardholder may then be required to login to a website to redeem rebates or points. Unlike the conventional loyalty programs, processing server 102 may provide real-time interaction with cardholder to allow the cardholder to apply previously received rebates or points when a payment is authorized by the issuer. As such, the redemption process may also be expedited. The process is described in greater detail in accordance with FIG. 4 and FIG. 9.

In some other examples, some conventional loyalty programs are implemented in an in house mode, i.e., issuing rewards without involving validation process by third parties. Unlike these conventional loyalty programs, processing server 102 may be configured to perform validation process on a real time message from a payment network. In some example implementations, the validation process of processing server 102 may be performed independently from the payment network. The process is described in greater detail in accordance with FIG. 5 and FIG. 10.

In some other examples, unlike conventional loyalty programs that take days to apply rebates to current transactions, processing server 102 may utilize electronic messages in communicating with issuer server 106 to expedite the rebate process. The expedited process is described in greater detail in accordance with FIG. 6 and FIG. 11.

In some other examples, in response to a request from issuer server 106, processing server 102 may be configured to generate a controlled payment number (CPN) associated with available rebates or points in consumer 104's account such that consumer 104 may use the CPN as conventional payment card number for future transactions. The generation of the CPN is described in greater detail in accordance with FIG. 7 and FIG. 12.

Processing Server

Figure 2:
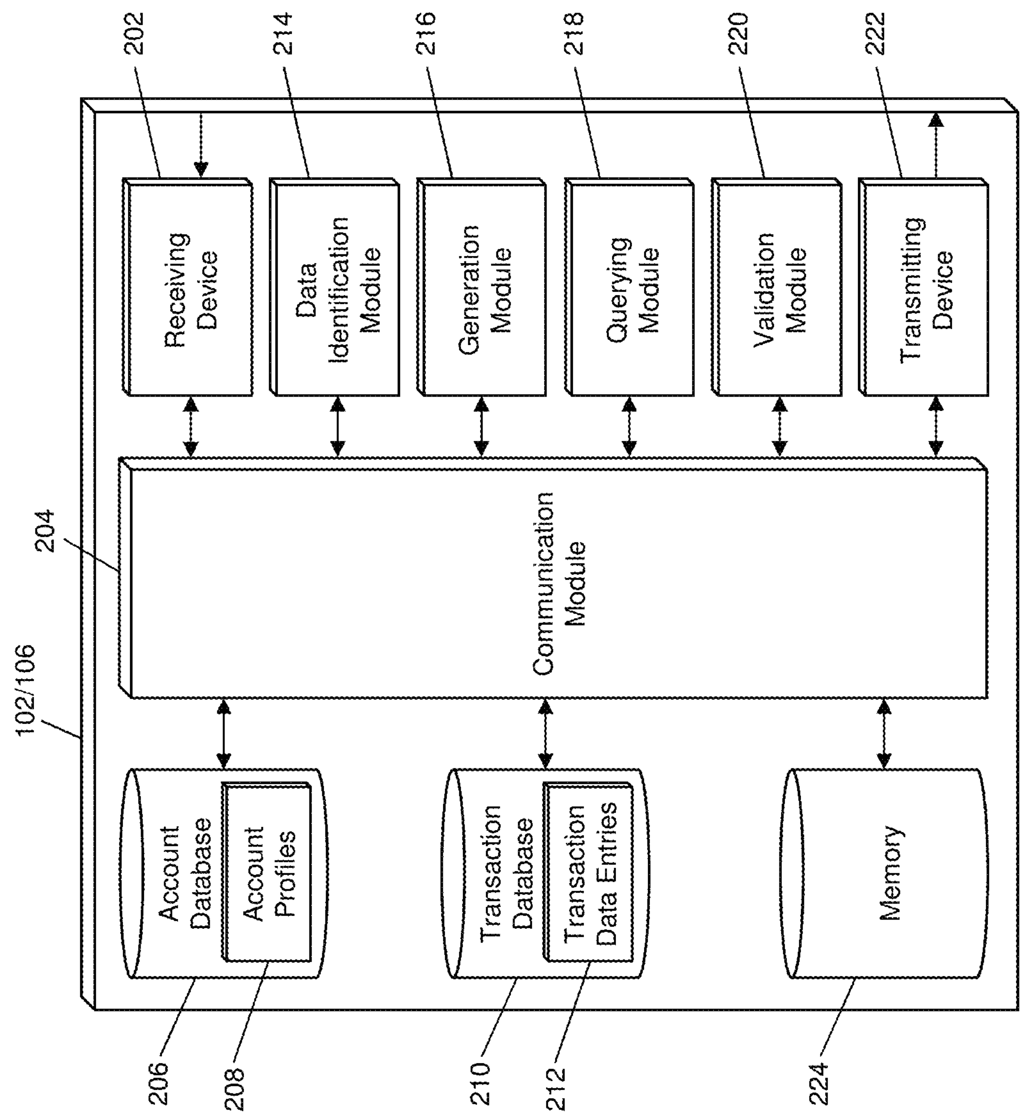
FIG. 2 is a block diagram illustrating the processing server of FIG. 1 for providing real-time rewards in accordance with exemplary embodiments.

FIG. 2 is a block diagram illustrating processing server 102 of FIG. 1 for providing real-time rewards in accordance with exemplary embodiments.

It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 1400 illustrated in FIG. 14 and discussed in more detail below may be a suitable configuration for processing server 102.

Processing server 102 may include a processing device. The processing device may be configured to perform the functions of processing server 102 discussed herein as will be apparent to persons having skill in the relevant art. In some embodiments, processing server 102, as shown in FIG. 1, may include a plurality of engines and/or modules specifically configured to perform one or more functions of processing server 102, such as a receiving device 202, a data identification module 214, a generation module 216, a querying module 218, a validation module 220, a transmitting device 222, a communication module 204, an account database 206 including a plurality of account profiles 208, a transaction database 210 including transaction data entries 212, and a memory 224. In some other embodiments, FIG. 2 may also illustrate an issuer server 106 of FIG. 1 that includes similar engines and/or modules to those of processing server 102.

In an example embodiment, processing server 102 may be configured to store account profiles 208 in account database 206. Each of account profiles 208 includes data associated with a transaction account generated for a cardholder. The data associated with the transaction account may be structured as a data set that at least includes identification information of the transaction account (e.g., the transaction account number or identifier) and a reward value. The reward value included in the data set may refer to available rebates or points that the cardholder received from previous transactions. The reward value may be interchangeably referred to as "account balance" or "reward balance" hereinafter.

In some implementations of the example embodiment, processing server 102 may be configured to store one or more reward rules in memory 224. The reward rules may refer to rules to identify, or calculate, reward costs based on data associated with a current transaction involving consumer 104. The reward costs in general may refer to the rebates or points needed for completing the current transaction. For example, when consumer 104 intends to purchase a television at a sale price of $500, one of the reward rules may indicates that, for purchases of electronics, either the same amount of rebates or points twice the sale price is sufficient to complete the current transaction.

Further to the example embodiment, receiving device 202 of processing server 102 may be configured to receive data over one or more networks via one or more network protocols. In some implementations, receiving device 202 may be configured to receive data over the payment rails explained in relation to FIG. 13, such as using specially configured infrastructure associated with payment network 112 for the transmission of transaction data that include sensitive financial data and information. In some instances, receiving device 202 may be configured to receive, via payment network 112, a transaction message that includes data associated with the current transaction. The transaction message may be formatted based on one or more standards (e.g., ISO 8583) and may include a plurality of data elements respectively configured to store a primary account number, a transaction amount, and additional transaction data including the subject of the transaction, the volume of the transaction, the category of the subject, merchant category code, merchant identifier, geographic location, payment method, acquirer identifier, issuer identifier, etc. The primary account number may refer to the account number of consumer 104's account and the transaction amount may refer to the total price of the current transaction.

Upon receiving the transaction message, querying module 218 of processing server 102 may be configured to execute a query on account database 206 to identify a specific account profile where the transaction account number corresponds to the primary account number stored in the received transaction message. In other words, querying module 218 may conduct a search in account database 206 to identify an account profile that matches the account number of consumer 104. As such, processing server 102 may also identify the reward values (e.g., available rebates or points) in the account of consumer 104.

Based on the transaction amount and the category of the transaction subject included in the transaction message, together with the reward rules stored in memory 224, generation module 216 may be configured to generate or calculate a reward cost for the current transaction. Further to the above example transaction of a $500 television, generation module 216 may be configured to identify or calculate the reward cost of the current transaction of the television as $500 or 1,000 points.

In some implementations, validation module 220 may be configured to determine eligibility of the current transaction for reward usage (i.e., applying the rebates or points) based on at least one reward eligibility rule stored in memory 224. Unlike the reward rules, the reward eligibility rules may refer to rules for determining whether a given transaction is eligible for applying the rebates or points. In more detail, validation module 220 may be configured to determine whether the current transaction is eligible for reward usage based on the additional transaction data in the transaction message including the subject of the transaction, the volume of the transaction, the category of the subject, etc. For example, validation module 220 may determine a transaction of television is eligible for reward usage but another transaction involving grocery is ineligible if the reward eligibility rule only allows transactions of electronics to be eligible for reward usage.

Further, validation module 220 may be configured to determine the eligibility for reward usage by the transaction account related to the identified specific account profile based on a correspondence between the included reward value and the generated reward cost. In other words, by comparing the reward cost for the current transaction to the reward value associated with consumer 104's account, validation module 220 may be configured to determine whether the reward value (e.g., available rebates or points) in consumer 104's account is sufficient for completing the current transaction. If validation module 220 determines that the current transaction is eligible for applying the rebates or points and the reward value is sufficient, generation module 216 may be configured to generate a rebate request to request corresponding rebates or points (or merely a portion of the rebates or points) to be applied to the current transaction and to request the cash or credits used for the current transaction to be refunded to consumer 104's account. Additionally, generation module 216 may be configured to generate a rebate amount based on the transaction amount included in the transaction message. The rebate amount may refer to the amount of rebates or points to be applied to the current transaction. The rebate amount may be equal to the transaction amount or merely a portion of the transaction amount. Thus, the rebate request may include at least a transaction identifier included in the received transaction message and the generated rebate amount. Transmitting device 222 of processing server 102 may be configured to superimpose the rebate request in a data signal and electronically transmit the data signal to issuer server 106.

In the case where validation module determines that the current transaction is eligible for reward usage and the available rebates or points in consumer 104's account is sufficient to complete the transaction, generation module 216 may be configured to generate a reward notification to notify consumer 104 that the rebates or points in his or her account will be applied to the current transaction. Transmitting device 222 may then be configured to superimpose the reward notification to a data signal and electronically transmit, via communication data such as e-mail, SMS, etc., the reward notification to consumer device 104A or other devices associated with consumer 104's account.

In another example embodiment, processing server 102 may similarly be configured to store account profiles 208 in account database 206. Receiving device 202 may be configured to receive data over one or more networks via one or more network protocols. In some implementations, receiving device 202 may be configured to receive a first transaction message related to a current payment transaction. The first transaction message may be formatted based on the one or more standards (e.g., ISO 8583) and may include a message type indicator indicative of an authorization request from acquirer server 110 via payment network 112. Further, the first transaction message may also include a plurality of data elements that respectively store a transaction identifier, a specific account identifier, a transaction amount, etc. In other words, when consumer 104 initiates the current payment transaction, processing server 102 may receive, from acquirer server 110, the first transaction message that includes information regarding the current payment transaction.

Subsequent to initiating the current payment transaction, consumer 104 may request to redeem the previously received rebates or points in his or her account by communicating with processing server 102. For example, consumer 104 may transmit, via an interface on consumer device 104A to processing server 102, a reward redemption request to redeem the previous received rebates or points immediately after initiating the current payment transaction. The reward redemption request may at least include identification information of the current payment transaction, e.g., a transaction identifier, and an account identifier of consumer 104's account.

Upon receiving the reward redemption request from consumer device 104A, generation module 216 may be configured to generate a reward cost based on at least a conversion rate stored in memory 224 and the transaction amount included in the data elements of the first transaction message. As described above, the reward cost may refer to the rebated or points needed for completing the current payment transaction. The conversion rate may refer to a correspondence between the points needed and the transaction amount. For example, the conversion rate may indicate that the cardholder can redeem one dollar for every five points.

Based on the received reward redemption request and the first transaction message, querying module 218 may first be configured to execute a query to identify the consumer 104's account profile in account database 206, i.e., a specific account profile where the account identifier corresponds to the account identifier included in the first transaction message. Further, querying module 218 may be configured to update the reward value such that a hold is placed on an amount of the reward value equivalent to the generated reward cost. The amount of the reward value on hold may be prevented from being redeemed by consumer 104.

Receiving device 202 may further receive, from issuer server 106, a second transaction message that may be similarly formatted based on the standards. The second transaction message may further include a message indicator indicative of a clearing record with respect to the current payment transaction and data elements storing the transaction identifier of the current payment transaction and a clearing amount. The clearing record may indicate that the payment transaction has been cleared, i.e., completed, and the clearing amount may refer to the actual amount of the payment transaction, which may or may not be the same as the transaction amount included in the first transaction message. For example, in a case where consumer 104 dines at a restaurant, the transaction amount included in the first transaction message may refer to the total amount of the food and the clearing amount may further include the amount of the tips. In another example where consumer 104 stays at a hotel, the transaction amount included in the first transaction message may refer to the pre-authorized amount and the clearing amount may refer to the actual transaction amount that may be lower than the pre-authorized amount.

Upon receiving the second transaction message that includes the clearing amount, querying module 218 may be further configured to execute another query on account database 206 to deduct a deduction amount from the reward value in consumer 104's account based on the clearing amount. The deduction amount may be generated based on at least the clearing amount and the conversion rate. For an example conversion rate that indicates that the cardholder can redeem one dollar for every five points, the deduction amount for a $500 television may be 2,500 points. Querying module 218 may also be configured to remove the hold on the amount of the reward value that is equivalent to the generated reward cost prior to deducting. Additionally or alternatively, querying module 218 may be configured to remove the hold on the amount of the reward value equivalent to the deduction amount before the deducting.

Additionally, generation module 216 may be configured to data signal superimposed with a rebate request. The rebate request may include at least the specific account identifier (i.e., the account identifier of consumer 104's account) and the clearing amount. Further, transmitting device 222 may then be configured to transmit the rebate request to issuer server 106 via payment network 112.

In a case where the clearing amount is less than the transaction amount, querying module 218 may be configured to execute a query on account database 206 to remove the hold on an amount of the reward value equivalent to a difference between the generated reward cost and the deduction amount.

Transmitting device 222 of processing 102 may be configured to electronically transmit a data signal superimposed with a confirmation request to consumer device 104A to confirm that the requested rewards can been redeemed and applied to the current payment transaction. The confirmation request may include at least the transaction identifier, the transaction amount, the clearing amount, etc. If consumer 104 confirms the redemption, receiving device 202 may then receive a data signal superimposed with a confirmation message from consumer device 104A. The confirmation message may include at least the transaction identifier and an indication to use the reward value included in consumer 104's account. In some examples, consumer device 104A may be configured to perform real-time processing of rebates for payment transactions.

In yet another example embodiment, processing server 102 may be similarly configured to store account profiles 208 in account database 206. Each of account profiles 208 includes data associated with a transaction account generated for a cardholder, e.g., consumer 104. The data associated with the transaction account may be structured as a data set that at least includes an account identifier and an account balance.

Receiving device 202 of processing server 102 may be configured to receive data over one or more networks via one or more network protocols. In some implementations, receiving device 202 may be configured to receive data over the payment rails explained in relation to FIG. 13, such as using specially configured infrastructure associated with payment network 112 for the transmission of transaction data that include sensitive financial data and information. In some instances, receiving device 202 may be configured to receive, from payment network 112 via an application programming interface, a data signal superimposed with a real-time message from an entity in payment network 112. The entity may refer to any computing device in payment network 112, which may include merchant server 108, acquirer server 110, issuer sever 106, etc. The real time message may at least include a specific account identifier that identifies the account profile involved in the current payment transaction, transaction data, a cost value, a reason code, and a transaction identifier. The cost value may refer to the amount of rebates or points needed to complete the current payment transaction and may be determined based on a conversion rate associated with a transaction currency and a reward currency. For example, the conversion rate may indicate that the cardholder can redeem one dollar for every five points in his or her account.

The reason code may refer to a code that indicates a result of a validation process performed at the entity in payment network 112. For example, the entity in payment network 112 may perform a validation process to validate the eligibility of the current payment transaction for applying rebates or points based on the merchant type, the transaction type, the category of the merchandise, etc. An example reason code of 70 may indicate that the current payment transaction has been determined to be valid.

Upon receiving the real-time message, querying module 218 may be configured to execute a query on account database 206 to identify a specific account profile where the included account identifier corresponds to the specific account identifier in the real-time message. In other words, querying module 218 may be configured to identify an account profile, from account database 206, which matches the specific account identifier in the real-time message.

Further, validation module 220 may be configured to validate the reason code included in the real-time message based on a plurality of predetermined valid reason codes. For example, validation module 220 may be configured to compare the reason code included in the real-time message with the plurality of valid reason codes stored in memory 224. If the reason code included in the real-time message matches one of the stored valid reason codes, validation module 220 may determine the reason code in the real-time message indicates that the current payment transaction is eligible for applying rebates or points in the identified account profile.

Additionally, validation module 220 may be also configured to validate the transaction account related to the identified specific account profile for eligibility of a rebate based on at least the included account balance and the cost value included in the real-time message. That is, validation module 220 may be configured to compare the included account balance with the cost value included in the real-time message. If the account balance is greater than or equal to the cost value included in the real-time message, validation module 220 may be configured to determine that the identified specific account profile is eligible for reward usage. Further, when the identified specific account profile is determined to be eligible for reward usage, querying module 218 may then be configured to execute a query on the account database to deduct the calculated reward cost from the account balance included in the specific account profile.

Subsequent to validation module 220 determining the validity of the current payment transaction and the eligibility of the identified account, generation module 216 of processing server 102 may be configured to generate a data signal superimposed with a rebate request to request rebates or points to be applied to the current payment transaction. The rebate request may at least include a rebate amount based on the cost value included in the real-time message, the specific account identifier, and the transaction identifier. In some examples, the rebate amount may be equal to the actual transaction amount. However, in other examples, since consumer 104 may choose to redeem rebates or points that are less than the transaction amount, the rebate amount may be less than the transaction amount.

Transmitting device 222 may then be configured to electronically transmit the generated data signal to the entity in payment network 112.

In yet another example embodiment, similarly, processing server 102 may be configured to store account profiles 208 in account database 206. Each of account profiles 208 includes data associated with a transaction account generated for a cardholder. The data associated with the transaction account may be structured as a data set that at least includes identification information of the transaction account (e.g., the transaction account number or identifier) and a reward value.

Receiving device 202 may receive a transaction message from acquirer server 110 via payment network 112. The transaction message may be formatted based on the one or more standards (e.g., ISO 8583) and may include a plurality of data elements respectively configured to store a primary account number, a transaction amount, and additional transaction data including at least a transaction identifier that identifies a current payment transaction. The primary account number may refer to the account number of consumer 104's account and the transaction amount may refer to the total price of the current transaction. In some examples, the transaction identifier may be a combination including at least one of: a merchant identifier, a transaction time, a transaction date, and a geographic location.

In addition, receiving device 202 may also receive a data signal superimposed with a rebate request from consumer device 104A via a communication network to request previously received rebates or points to be applied to the current payment transaction. The rebate request may at least include the transaction identifier that identifies the current payment transaction.

Upon receiving the rebate request, data identification module 214 may be configured to identify a financial institution associated with a transaction account corresponding to the primary account number based on at least one of: the primary account number and the additional transaction data included in the received transaction message. That is, querying module 218 may first identify, from account profiles 208, a transaction account corresponding to the primary account number. Based on the identified transaction account, data identification module 214 may identify the financial institution associated with the transaction account, e.g., the issuer of the transaction account.

Subsequent to receiving the data signal superimposed with the rebate request, generation module 216 of processing server 102 may be configured to generate a data message comprising the rebate request. In addition, the data message may further include at least the primary account number and the transaction amount included in the received transaction message. In some examples, the data message may not include other rebate requests with respect to other payment transactions such that the transmitting of the data message may not be delayed due to the process of other rebate request.

Transmitting device 222 may then be configured to electronically transmit the generated data message to the identified financial institution via payment network 112 in real-time. As such, since processing server 102 is configured to electronically transmit the rebate request to issuer server 106, rather than sending hardcopies of documents to the issuer, the rebate process may be expedited.

In yet another example embodiment, issuer server 106 may include similar engines and/or modules to those of processing server 102. For example, issuer server 106 may be similarly configured to store account profiles 208 in account database 206. Each of account profiles 208 includes data associated with a transaction account generated for a cardholder. The data associated with the transaction account may be structured as a data set that at least includes identification information of the transaction account (e.g., the transaction account number or identifier) and a reward balance.

Receiving device 202 of issuer server 106 may be configured to receive a data signal superimposed with a redemption request from consumer device 104A via a communication network. The redemption request may indicate that consumer 104 intends to redeem an amount of previously received rebates or points. The redemption request may at least include a specific account identifier that identifies consumer 104's account and a reward amount that consumer 104 intends to redeem.

Upon receiving the data signal superimposed with the redemption request, querying module 218 of issuer server 106 may be configured to execute a query on account database 206 of issuer server 106 to identify a specific account profile wherein the included account identifier corresponds to the specific account identifier included in the redemption request. That is, querying module 218 of issuer server 106 may identify the specific account profile that matches the specific account identifier in the redemption request.

With respect to the identified specific account profile, validation module 220 of issuer server 106 may be configured to validate the reward balance included in the identified specific account profile as sufficient based on a correspondence between the reward balance and the reward amount included in the redemption request. If the reward balance is equal to or greater than the reward amount included in the redemption request, validation module 220 may determine that the reward balance is sufficient for the redemption request.

If the reward balance is determined to be sufficient, i.e., validated, generation module 216 of issuer server 106 may be configured to generate a data signal superimposed with a controlled payment number (CPN) request. The CPN request may indicate that consumer 104 intends to redeem at least a portion of the available rebates or points and may at least include the specific account identifier and a currency amount generated based on the reward amount. The currency amount may or may not be equivalent to the reward amount. At least in some examples, generation module 216 may be configured to generate the currency amount based on at least application of a conversion rate to the reward amount included in the redemption request. For example, when the redemption request indicates that consumer 104 intends to redeem 500 points, generation module 216 may generate the currency amount to be 50 US dollars if the conversion rate is 10 points for one dollar.

Transmitting device 222 of issuer server 106 may be configured to electronically transmit the generated data signal to processing server 102 via payment network 112. Processing server 102 may be configured to generate a CPN subject to a transaction control restricting usage of the CPN to the currency amount. That is, consumer 104 may only use the CPN for a transaction amount less than the currency amount. The CPN may be transmitted by processing server 102 to issuer server 106 once generated.

Receiving device 202 may receive payment credentials from processing server 102. The payment credentials may be associated with the CPN, consumer 104's account, and a financial institution that provides the consumer 104's account. The payment credentials may be stored in a secure data storage on issuer server 106. Further, the payment credentials may be electronically transmitted to consumer device 104A by issuer server 106.

Figure 3:
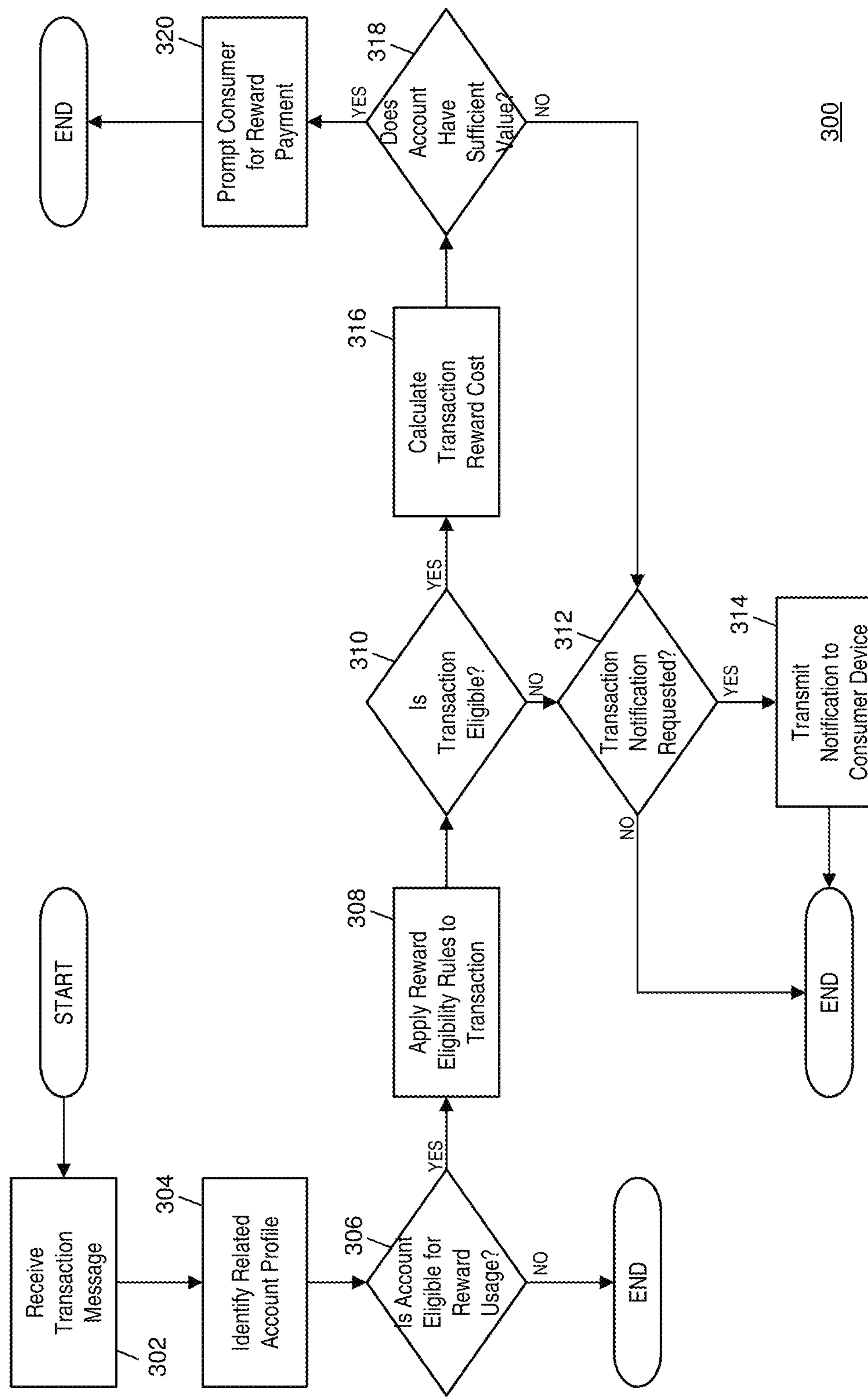
FIG. 3 is a flow diagram illustrating the process of determining rebate eligibility of an electronic transaction in accordance with exemplary embodiments.

FIG. 3 is a flow diagram illustrating the process 300 of determining rebate eligibility of an electronic transaction in accordance with exemplary embodiments.

At 302, receiving device 202 may be configured to receive, via payment network 112, the transaction message that includes data associated with the current transaction. The transaction message may include a plurality of data elements respectively configured to store a primary account number, a transaction amount, and additional transaction data including the subject of the transaction, the volume of the transaction, the category of the subject, merchant category code, merchant identifier, geographic location, payment method, acquirer identifier, issuer identifier, etc.

At 304, querying module 218 may be configured to execute a query on account database 206 to identify a specific account profile where the transaction account number corresponds to the primary account number stored in the received transaction message. In other words, querying module 218 may conduct a search in account database 206 to identify an account profile that matches the account number of consumer 104.

At 306, validation module 220 may be configured to determine whether consumer 104's account is eligible for reward usage based on information included in the transaction message. For example, validation module 220 may determine the eligibility of the account based on the issuer identifier included in the transaction message. That is, if the issuer identifier in the transaction message that indicates the issuer of the account does not match any issuers providing loyalty programs, validation module 220 may determine that consumer 104's account is not eligible for reward usage and process 300 ends; otherwise, validation module 220 may determine that consumer 104's account is eligible for reward usage and process 300 may continue to 308.

At 308, validation module 220 may be configured to apply reward eligibility rules stored in memory 224. The reward eligibility rules may refer to rules for determining whether a given transaction is eligible for applying the rebates or points.

At 310, validation module 220 may be configured to determine whether the current transaction is eligible for reward usage. In more detail, validation module 220 may be configured to determine whether the current transaction is eligible for reward usage based on the additional transaction data in the transaction message including the subject of the transaction, the volume of the transaction, the category of the subject, etc. If the current transaction is determined to be eligible, process 300 may continue to 316; if the current transaction is determined to be ineligible, process 300 may continue to 312.

At 312, generation module 216 may be configured to determine whether a transaction notification is requested by consumer 104 based at least on user settings included in the transaction message and generate the transaction notification accordingly. If the transaction notification is not requested by consumer 104, process 300 ends; if the transaction notification is requested by consumer 104, process 300 may continue to 314.

At 314, transmitting device 222 may be configured to superimpose the generated transaction notification in a data signal and transmit the data signal to consumer device 104A.

At 316, generation module 216 may be configured to generate or calculate a reward cost for the current transaction based on the transaction amount and the category of the transaction subject included in the transaction message, together with the reward rules stored in memory 224. In the example of a transaction involving a $500 television, generation module 216 may be configured to identify or calculate the reward cost of the current transaction of the television as $500 or 1,000 points.

At 318, validation module 220 may be configured to determine whether the reward value (e.g., available rebates or points) in consumer 104's account is sufficient for completing the current transaction by comparing the reward cost for the current transaction to the reward value associated with consumer 104's account. If the reward value in consumer 104's account is sufficient, process 300 may continue to 320; if the reward value in consumer 104's account is not sufficient for completing the current transaction, process 300 may continue to 312.

At 320, generation module 216 may be configured to generate a consumer prompt to notify consumer 104 that the rebates or points in consumer 104's account are to be applied to the current transaction.

Figure 4:
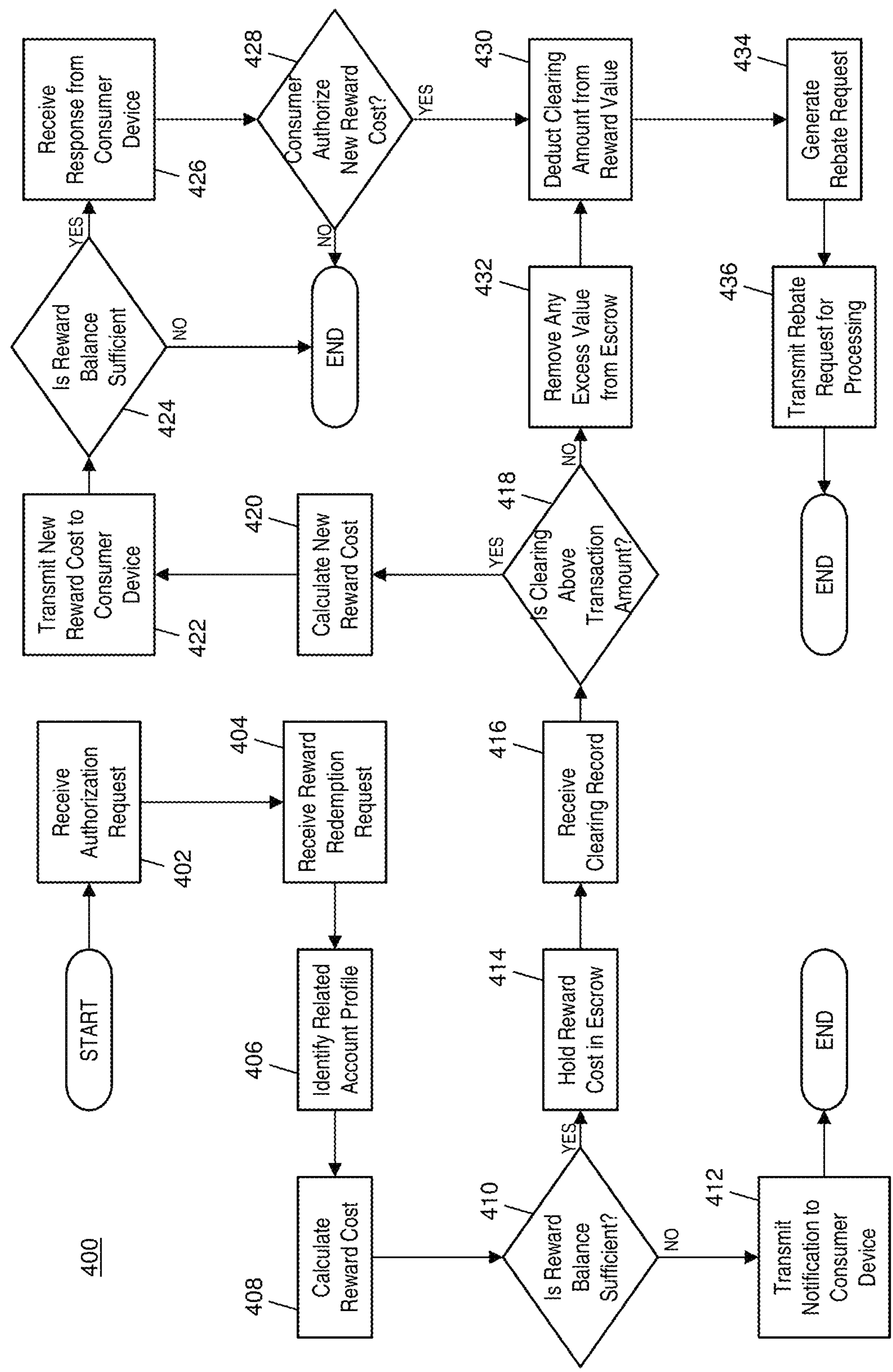
FIG. 4 is another flow diagram illustrating the process of managing reward value related to a transaction account in accordance with exemplary embodiments.

FIG. 4 is another flow diagram illustrating the process 400 of managing reward value related to a transaction account in accordance with exemplary embodiments.

At 402, receiving device 202 may be configured to receive a first transaction message related to a current payment transaction. The first transaction message may be formatted based on the one or more standards (e.g., ISO 8583) and may include a message type indicator indicative of an authorization request from acquirer server 110 via payment network 112. Further, the first transaction message may also include a plurality of data elements that respectively store a transaction identifier, a specific account identifier, a transaction amount, etc. In other words, when consumer 104 initiates the current payment transaction, processing server 102 may receive, from acquirer server 110, the first transaction message that includes information regarding the current payment transaction.

At 404, receiving device 202 may be configured to receive, from consumer device 104A, a reward redemption request to redeem the previous received rebates or points. The reward redemption request may at least include identification information of the current payment transaction, e.g., a transaction identifier, and an account identifier of consumer 104's account.

At 406, querying module 218 may first be configured to execute a query to identify the consumer 104's account profile in account database 206, i.e., a specific account profile where the account identifier corresponds to the account identifier included in the first transaction message.

At 408, generation module 216 may be configured to generate a reward cost based on at least a conversion rate stored in memory 224 and the transaction amount included in the data elements of the first transaction message.

At 410, querying module 218 may be configured to determine whether the reward balance (i.e., the reward value stored in account database 206) in the specific account profile is sufficient for the payment transaction. If the reward balance is determined to be sufficient, process 400 may continue to 414; if the reward balance is determined to be insufficient, process 400 may continue to 412.

At 412, transmitting device 222 may be configured to transmit a notification to consumer device 104A to notify consumer 104 that the reward balance in his or her account is not sufficient for the current payment transaction.

At 414, querying module 218 may be configured to hold an amount of reward value equivalent to the generated reward cost in an escrow account. In other words, querying module 218 may be configured to update the reward value such that a hold is placed on an amount of the reward value equivalent to the generated reward cost. The amount of the reward value on hold may be prevented from being redeemed by consumer 104.

At 416, receiving device 202 may receiving a second transaction message that include a clearing record with respect to the current payment transaction and a clearing amount. The clearing record may indicate that the payment transaction has been cleared, i.e., completed, and the clearing amount may refer to the actual amount of the payment transaction, which may or may not be the same as the transaction amount included in the first transaction message.

At 418, querying device 218 may be configured to determine if the clearing amount is above the transaction amount included in the first transaction message. If the clearing amount is determined to be above the transaction amount, process 400 may continue to 420; if the clearing amount is determined to be equal to or less than the transaction amount, process 400 may continue to 432.

At 420, generation module 216 may be configured to calculate a new reward cost based on the clearing amount and the conversion rate. Since the clearing amount has been determined to be above the transaction amount, the calculated new reward cost may also be greater than the previously calculated reward cost.

At 422, transmitting device 222 may be configured to transmit the new reward cost to consumer device 104A.

At 424, querying module 218 may be configured to determine whether the reward balance in the specific account profile is sufficient for the clearing amount. If the reward balance is determined to be sufficient for the clearing amount, process 400 may continue to 426; if the reward balance is determined to be insufficient for the clearing amount, process 400 ends.

At 426, receiving device 202 may be configured to receive a response from consumer device 104A. The response may indicate that a confirmation from consumer 104 to proceed with using reward balance for the current payment transaction or may indicate a refusal to use the reward balance for the current payment transaction.

At 428, querying module 218 may be configured to determine if consumer 104 authorized to use reward balance for the new reward cost based on the response from consumer device 104A. If consumer 104 authorized to use reward balance for the new reward cost, process 400 may continue to 430; if consumer 104 did not authorize to use the reward balance for the new reward cost, process 400 ends.

At 432, when the clearing amount is equal to or less than the transaction amount, querying module 218 may be configured to remove the excessive amount from the escrow account.

At 430, querying module 218 may be configured to deduct a deduction amount from the reward value in consumer 104's account based on the clearing amount. The deduction amount may be generated based on at least the clearing amount and the conversion rate. For an example conversion rate that indicates that the cardholder can redeem one dollar for every five points, the deduction amount for a $500 television may be 2,500 points.

At 434, generation module 216 may be configured to data signal superimposed with a rebate request. The rebate request may include at least the specific account identifier (i.e., the account identifier of consumer 104's account) and the clearing amount.

At 436, transmitting device 222 may then be configured to transmit the rebate request to issuer server 106 via payment network 112.

Figure 5:
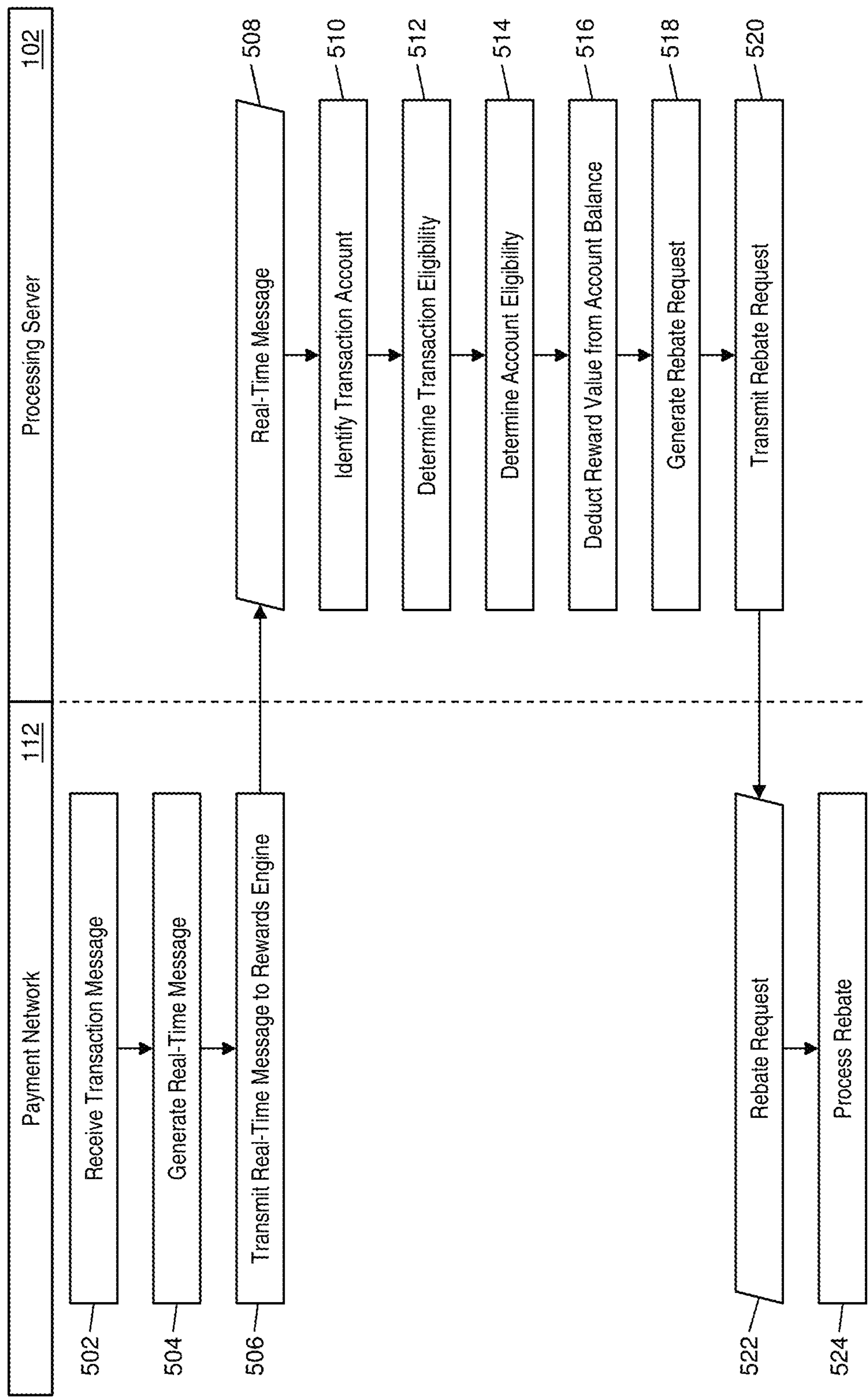
FIG. 5 is another flow diagram illustrating the interaction between the payment network and the processing server of FIG. 1 for determining rebate eligibility of a transaction account in accordance with exemplary embodiments.

FIG. 5 is another flow diagram illustrating a process 500 of the interaction between the payment network and the processing server of FIG. 1 for determining rebate eligibility of a transaction account in accordance with exemplary embodiments.

At 502, an entity in payment network 112 may receive a transaction message from merchant 108. The transaction message may include data associated with the current payment transaction such as a primary account number, a transaction amount, and additional transaction data including the subject of the transaction, the volume of the transaction, the category of the subject, merchant category code, merchant identifier, geographic location, payment method, acquirer identifier, issuer identifier, etc.

At 504, the entity in payment network 112 may then generate a real-time message 508 based on the information included in the transaction message. In at least some example, real-time message 508 may include a specific account identifier that identifies the account profile involved in the current payment transaction, transaction data, a cost value, a reason code, and a transaction identifier.

At 506, the entity in payment network 112 may transmit real-time message to a rewards engine executed on processing server 102.

At 508, the receiving device 202 of the processing server 102 may receive the real-time message from payment network 112.

At 510, querying module 218 may be configured to execute a query on account database 206 to identify a specific account profile where the included account identifier corresponds to the specific account identifier in the real-time message. In other words, querying module 218 may be configured to identify an account profile, from account database 206, which matches the specific account identifier in the real-time message.

At 512, validation module 220 may be configured to validate the reason code included in the real-time message based on a plurality of predetermined valid reason codes. For example, validation module 220 may be configured to compare the reason code included in the real-time message with the plurality of valid reason codes stored in memory 224. If the reason code included in the real-time message matches one of the stored valid reason codes, validation module 220 may determine the reason code in the real-time message indicates that the current payment transaction is eligible for applying rebates or points in the identified account profile.

At 514, validation module 220 may be also configured to validate the transaction account related to the identified specific account profile for eligibility of a rebate based on at least the included account balance and the cost value included in the real-time message. That is, validation module 220 may be configured to compare the included account balance with the cost value included in the real-time message. If the account balance is greater than or equal to the cost value included in the real-time message, validation module 220 may be configured to determine that the identified specific account profile is eligible for reward usage.

At 516, when the identified specific account profile is determined to be eligible for reward usage, querying module 218 may then be configured to execute a query on the account database to deduct the calculated reward cost from the account balance included in the specific account profile.

At 518, subsequent to validation module 220 determining the validity of the current payment transaction and the eligibility of the identified account, generation module 216 of processing server 102 may be configured to generate a data signal superimposed with a rebate request to request rebates or points to be applied to the current payment transaction. The rebate request may at least include a rebate amount based on the cost value included in the real-time message, the specific account identifier, and the transaction identifier.

At 520, transmitting device 222 may then be configured to electronically transmit generated data signal superimposed with a rebate request to the entity in payment network 112.

At step 522, the entity in payment network 112 may receive the rebate request.

At 524, the entity in payment network 112 may be configured to process the rebate based on the information included in rebate request.

Figure 6:
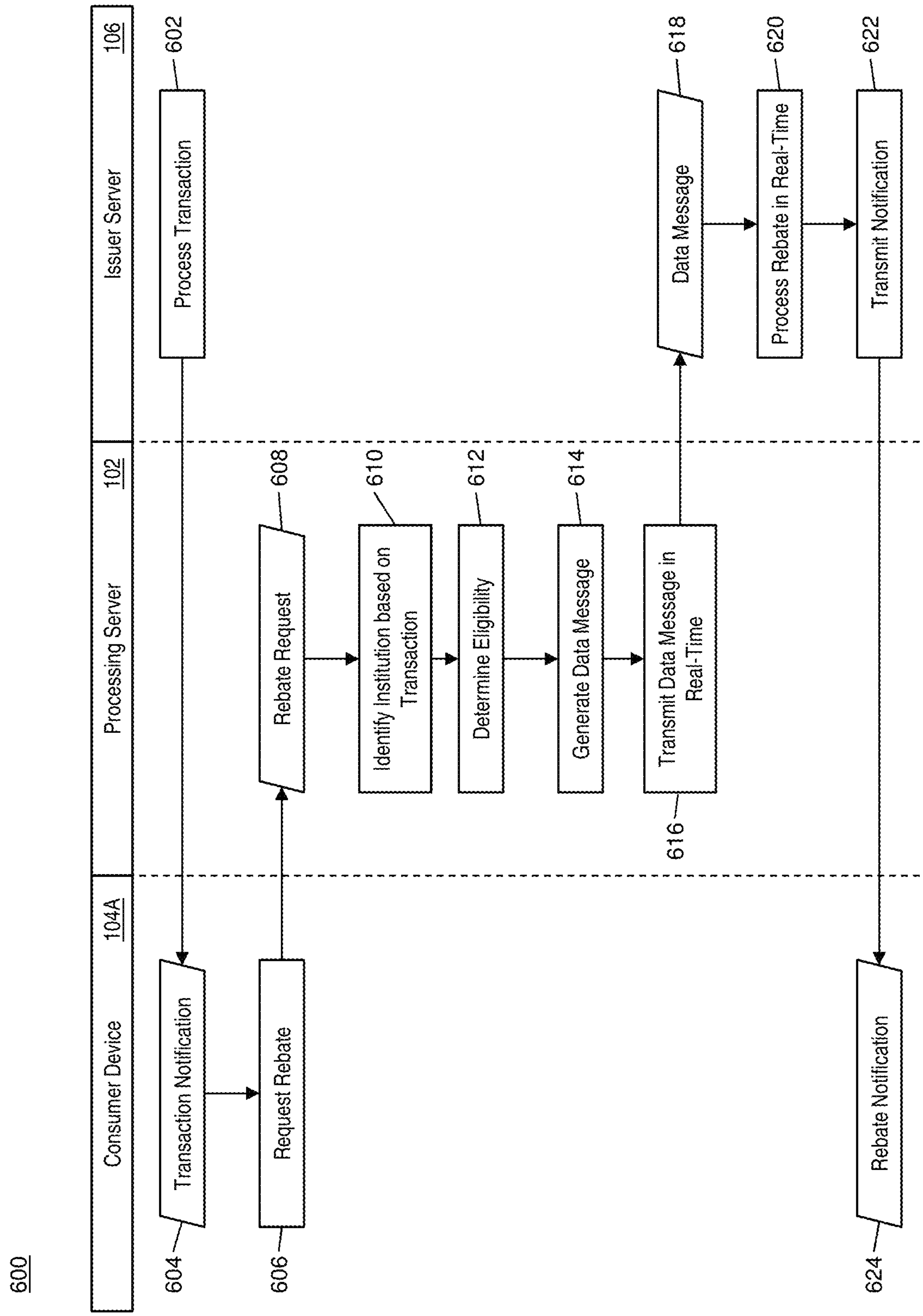
FIG. 6 is another flow diagram illustrating the interaction between the consumer device, the processing server, and the issuer server of FIG. 1 for real-time processing of a rebate in accordance with exemplary embodiments.

FIG. 6 is another flow diagram illustrating a process 600 of the interaction between the consumer device, the processing server, and the issuer server of FIG. 1 for real-time processing of a rebate in accordance with exemplary embodiments.

At 602, issuer server 106 may be configured to process a current payment transaction initiated by consumer 104. During processing the current payment transaction, issuer server 106 may be configured to transmit a transaction notification to consumer device 104A to notify consumer 104 that the current payment transaction is being processed.

At 604, consumer device 104A may receive the transaction notification from issuer server 106.

At 606, upon receiving the transaction notification from issuer server 106, consumer 104 may decide to use the rebates or points in his or her account and may submit a rebate request via a user interface on consumer device 104A. In other words, consumer device 104A may be configured to transmit rebate request 608 via a communication network to processing server 102.

At 608, the receiving device 202 of the processing server 102 may receive the rebate request from consumer 104 via consumer device 104A.

At 610, data identification module 214 may be configured to identify a financial institution associated with a transaction account corresponding to the primary account number based on at least one of: the primary account number and the additional transaction data included in the received transaction message.

At 612, validation module 220 may be configured to validate eligibility for a rebate for the payment transaction based on at least a correspondence between the reward value included in the identified specific account profile and the transaction amount stored in the second data element included in the received transaction message. In other words, validation module 220 may be configured to compare the reward value (i.e., available rebates or points in consumer 104's account) to the transaction amount of the current payment transaction. If the reward value is equal to or greater than the transaction amount, i.e., the reward value is sufficient for completing the current payment transaction, validation module 220 may determine that the current payment transaction is eligible for applying the rebates or points in consumer 104's account.

At 614, generation module 216 of processing server 102 may be configured to generate a data message comprising the rebate request. In addition, data message may further include at least the primary account number and the transaction amount included in the received transaction message.

At 616, transmitting device 222 may then be configured to electronically transmit the generated data message to the identified financial institution via payment network 112 in real-time.

At 618, issuer server 106 may receive the data message from the processing server 102.

At 620, issuer server 106 may be configured to apply the rebates or points in consumer 104's account to the current payment transaction in accordance with the information included in data message.

At 622, issuer server 106 may be configured to transmit a rebate notification to consumer device 104A to notify consumer 104 that the rebates or points have been applied to the current payment transaction.

At 624, consumer 104 may receive the rebate notification via consumer device 104A.

Figure 7:
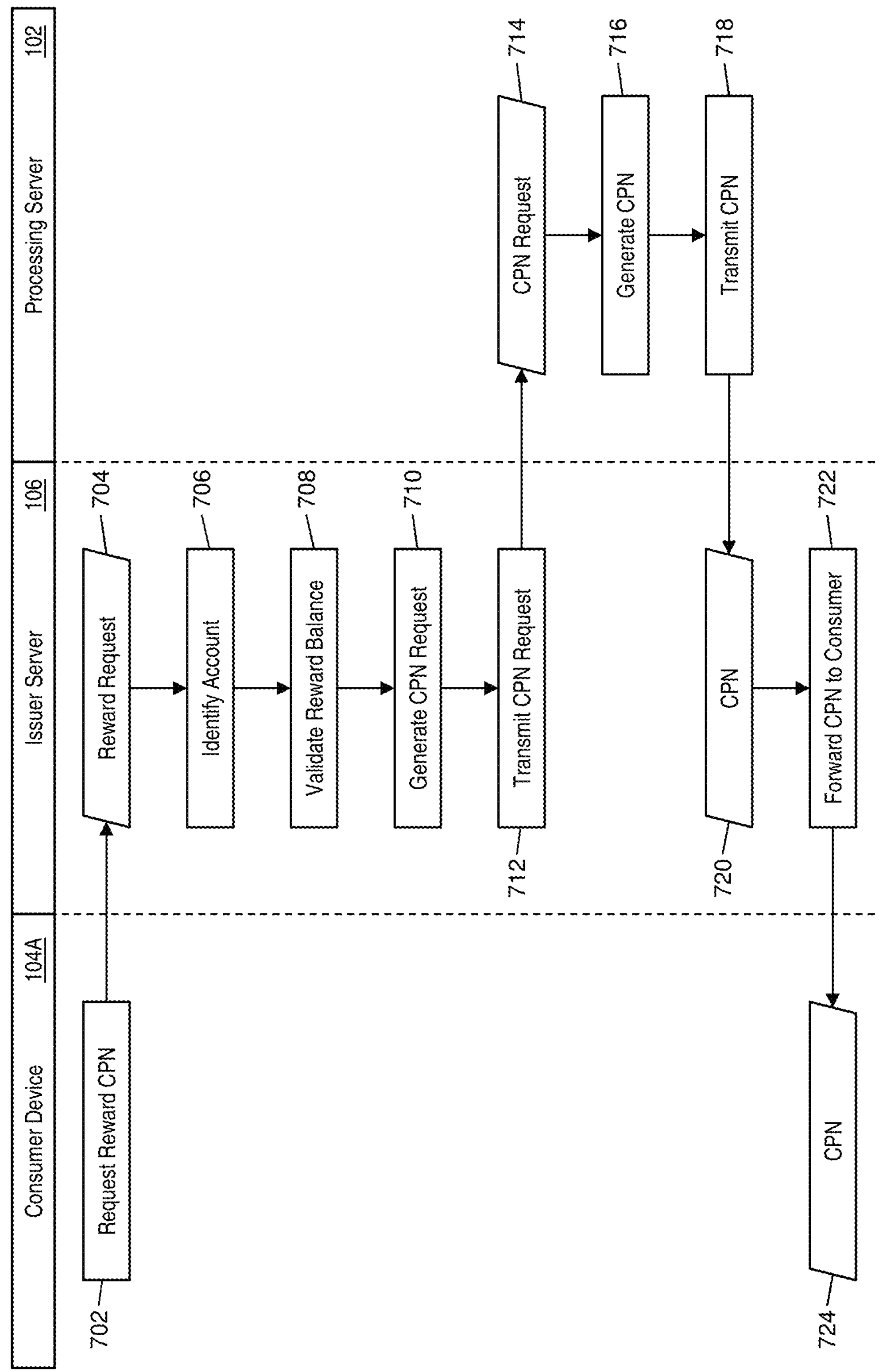
FIG. 7 is another flow diagram illustrating the interaction between the consumer device, the issuer server, and the processing server of FIG. 1 for generating a controlled payment number using reward value in accordance with exemplary embodiments.

FIG. 7 is another flow diagram 700 illustrating the interaction between the consumer device, the issuer server, and the processing server of FIG. 1 for generating a controlled payment number using reward value in accordance with exemplary embodiments.

At 702, consumer device 104A may be configured to generate a redemption request that requests a CPN for an amount of previously received rebates or points.

At 704, receiving device 202 of issuer server 106 may be configured to receive a data signal superimposed with redemption request from consumer device 104A via a communication network. The redemption request may at least include a specific account identifier that identifies consumer 104's account and a reward amount that consumer 104 intends to redeem.

At 706, querying module 218 of issuer server 106 may be configured to execute a query on account database 206 of issuer server 106 to identify a specific account profile wherein the included account identifier corresponds to the specific account identifier included in the redemption request. That is, querying module 218 of issuer server 106 may identify the specific account profile that matches the specific account identifier in the redemption request.

At 708, validation module 220 of issuer server 106 may be configured to validate the reward balance included in the identified specific account profile as sufficient based on a correspondence between the reward balance and the reward amount included in the redemption request. If the reward balance is equal to or greater than the reward amount included in the redemption request, validation module 220 may determine that the reward balance is sufficient for the redemption request.

At 710, generation module 216 of issuer server 106 may be configured to generate a data signal superimposed with a controlled payment number (CPN) request. The CPN request may indicate that consumer 104 intends to redeem at least a portion of the available rebates or points and may at least include the specific account identifier and a currency amount generated based on the reward amount. The currency amount may or may not be equivalent to the reward amount.

At 712, transmitting device 222 of issuer server 106 may be configured to electronically transmit the generated data signal that includes CPN request to processing server 102 via payment network 112.

At 714, the receiving device 202 of the processing server 102 may receive the generated data signal that includes CPN request.

At 716, processing server 102 may be configured to generate the requested CPN and provide payment credentials associated with the CPN.

At 718, processing server 102 may transmit the CPN together with the payment credentials to issuer server 106 via payment network 112.

At 720, the receiving device 202 of issuer server 106 may receive the CPN together with the payment credentials.

At 722, transmitting device 222 of issuer server 106 may be configured to forward the CPN and the payment credentials to consumer device 104A.

At 724, consumer 104 may receive the CPN from issuer server 106 via consumer device 104A.

Figure 8:
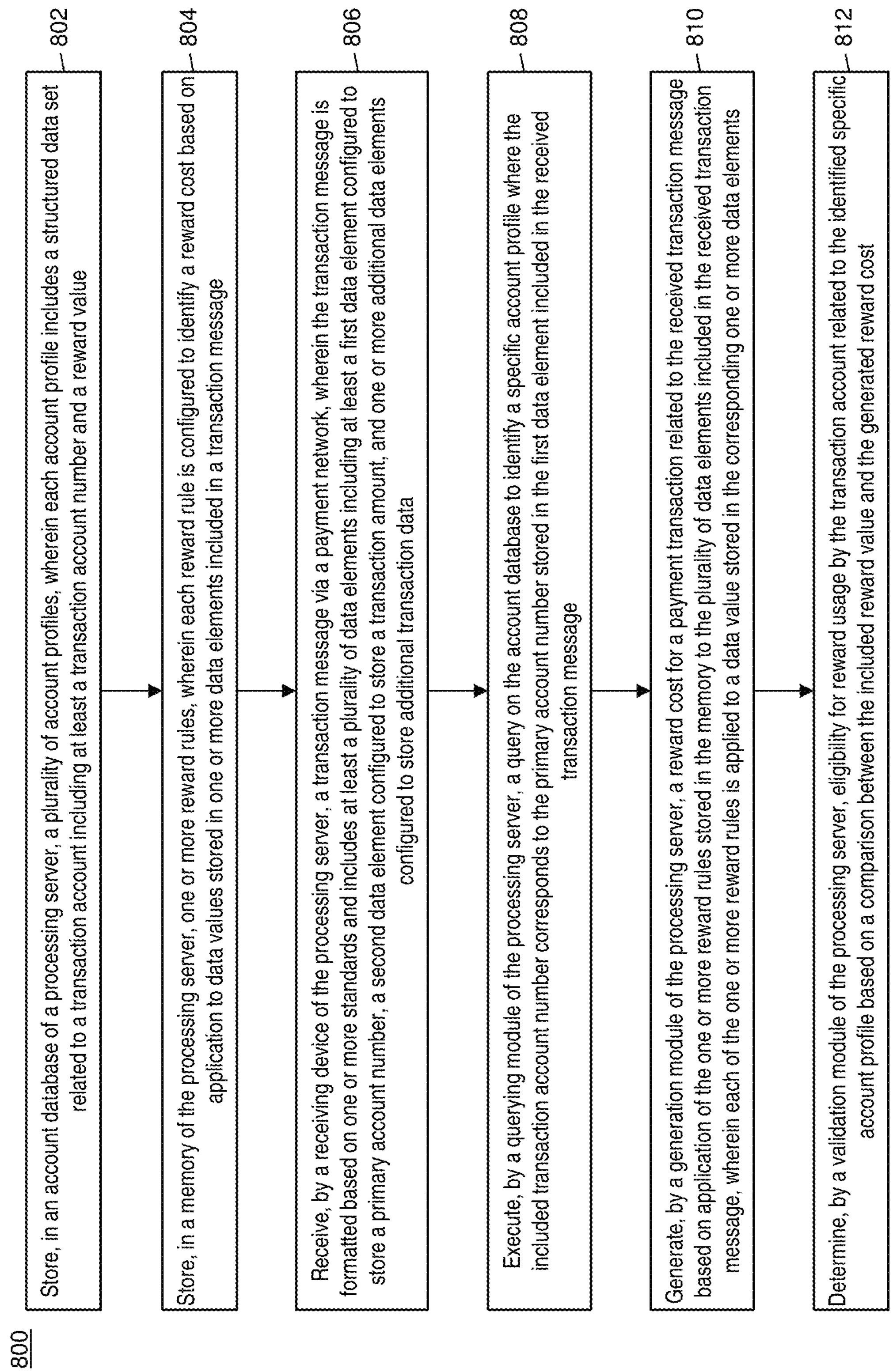
FIG. 8 is a flow chart illustrating the process of determining rebate eligibility of an electronic transaction in accordance with exemplary embodiments.

FIG. 8 is a flow chart 800 illustrating the process of determining rebate eligibility of an electronic transaction in accordance with exemplary embodiments.

At 802, processing server 102 may be configured to store account profiles 208 in account database 206. Each of account profiles 208 includes data associated with a transaction account generated for a cardholder. The data associated with the transaction account may be structured as a data set that at least includes identification information of the transaction account (e.g., the transaction account number) and a reward value. The reward value included in the data set may refer to available rebates or points that the cardholder received from previous transactions.

At 804, processing server 102 may be configured to store one or more reward rules in memory 224. The reward rules may refer to rules to identify, or calculate, reward costs based on data associated with a current transaction involving consumer 104. The reward costs in general may refer to the rebates or points needed for processing the current transaction. For example, when consumer 104 intends to purchase a television at a sale price of $500, one of the reward rules may indicates that, for purchases of electronics, either the same amount of rebates or points twice the sale price is sufficient to complete the current transaction.

At 806, a receiving device of processing server 102 may be configured to receive a transaction message via a payment network, wherein the transaction message is formatted based on one or more standards and includes at least a plurality of data elements including at least a first data element configured to store a primary account number, a second data element configured to store a transaction amount, and one or more additional data elements configured to store additional transaction data. For example, receiving device 202 may be configured to receive, via payment network 112, a transaction message that includes data associated with the current transaction. The transaction message may be formatted based on one or more standards (e.g., ISO 8583) and may include a plurality of data elements respectively configured to store a primary account number, a transaction amount, and additional transaction data including the subject of the transaction, the volume of the transaction, the category of the subject, merchant category code, merchant identifier, geographic location, payment method, acquirer identifier, issuer identifier, etc. The primary account number may refer to the account number of consumer 104's account and the transaction amount may refer to the total price of the current transaction.

At 808, querying module 218 of processing server 102 may be configured to execute a query on account database 206 to identify a specific account profile where the transaction account number corresponds to the primary account number stored in the first data element included in the received transaction message. In other words, querying module 218 may conduct a search in account database 206 to identify an account profile that matches the account number of consumer 104. As such, processing server 102 may also identify the reward values (e.g., available rebates or points) in the account of consumer 104.

At 810, generation module 216 may be configured to generate or calculate a reward cost for the current transaction based on the transaction amount and the category of the transaction subject included in the transaction message, together with the reward rules stored in memory 224.

At 812, validation module 220 may be configured to determine eligibility for reward usage by the transaction account related to the identified specific account profile by comparing the included reward value to the generated reward cost. In this way, validation module 220 may be configured to determine whether the reward value (e.g., available rebates or points) in consumer 104's account is sufficient for completing the current transaction.

Figure 9:
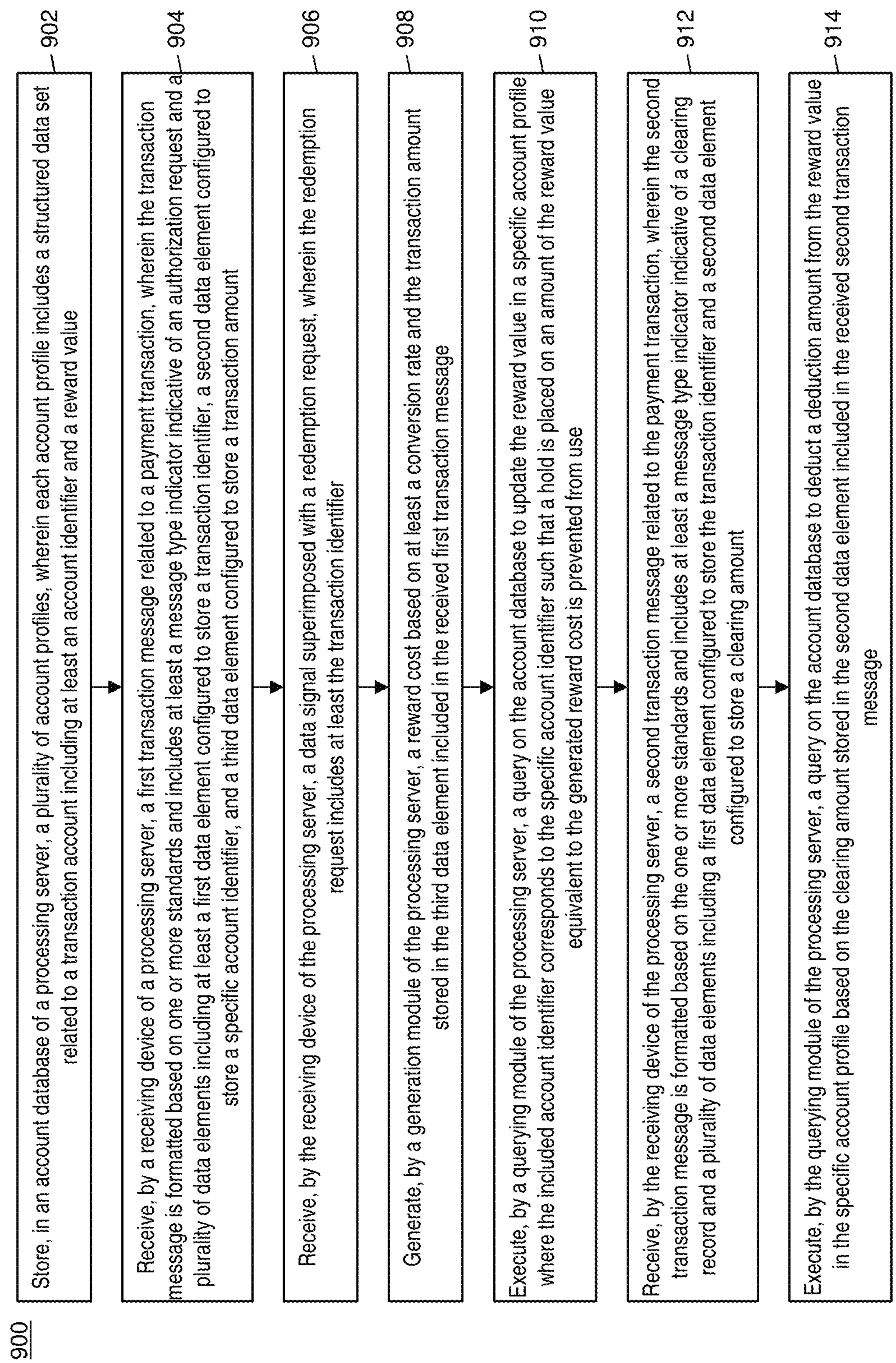
FIG. 9 is another flow chart illustrating the process of managing reward value related to a transaction account in accordance with exemplary embodiments.

FIG. 9 is another flow chart 900 illustrating the process of managing reward value related to a transaction account in accordance with exemplary embodiments.

At 902, processing server 102 may be configured to store account profiles 208 in account database 206. Each of account profiles 208 includes data associated with a transaction account generated for a cardholder. The data associated with the transaction account may be structured as a data set that at least includes identification information of the transaction account (e.g., the transaction account number) and a reward value. The reward value included in the data set may refer to available rebates or points that the cardholder received from previous transactions.

At 904, receiving device 202 may be configured to receive a first transaction message related to a current payment transaction. The first transaction message may be formatted based on the one or more standards (e.g., ISO 8583) and may include a message type indicator indicative of an authorization request from acquirer server 110 via payment network 112. Further, the first transaction message may also include a plurality of data elements that respectively store a transaction identifier, a specific account identifier, a transaction amount, etc. In other words, when consumer 104 initiates the current payment transaction, processing server 102 may receive, from acquirer server 110, the first transaction message that includes information regarding the current payment transaction.

At 906, receiving device 202 may be configured to receive a reward redemption request to redeem the previous received rebates or points. The reward redemption request may at least include identification information of the current payment transaction, e.g., a transaction identifier, and an account identifier of consumer 104's account.

At 908, upon receiving the reward redemption request from consumer device 104A, generation module 216 may be configured to generate a reward cost based on at least a conversion rate stored in memory 224 and the transaction amount included in the data elements of the first transaction message. As described above, the reward cost may refer to the rebated or points needed for completing the current payment transaction. The conversion rate may refer to a correspondence between the points needed and the transaction amount.

At 910, based on the received reward redemption request and the first transaction message, querying module 218 may first be configured to execute a query to identify the consumer 104's account profile in account database 206, i.e., a specific account profile where the account identifier corresponds to the account identifier included in the first transaction message. Further, querying module 218 may be configured to update the reward value such that a hold is placed on an amount of the reward value equivalent to the generated reward cost. The amount of the reward value on hold may be prevented from being redeemed by consumer 104.

At 912, receiving device 202 may further receive, from issuer server 106, a second transaction message that may be similarly formatted based on the standard. The second transaction message may further include a message indicator indicative of a clearing record with respect to the current payment transaction and data elements including a first data element configured to store the transaction identifier and a second data element configured to store a clearing amount. The clearing record may indicate that the payment transaction has been cleared, i.e., completed, and the clearing amount may refer to the actual amount of the payment transaction, which may or may not be the same as the transaction amount included in the first transaction message.

At 914, querying module 218 may be further configured to execute another query on account database 206 to deduct a deduction amount from the reward value in consumer 104's account based on the clearing amount stored in the second data element included in the received second transaction message. The deduction amount may be generated based on at least the clearing amount and the conversion rate.

Figure 10:
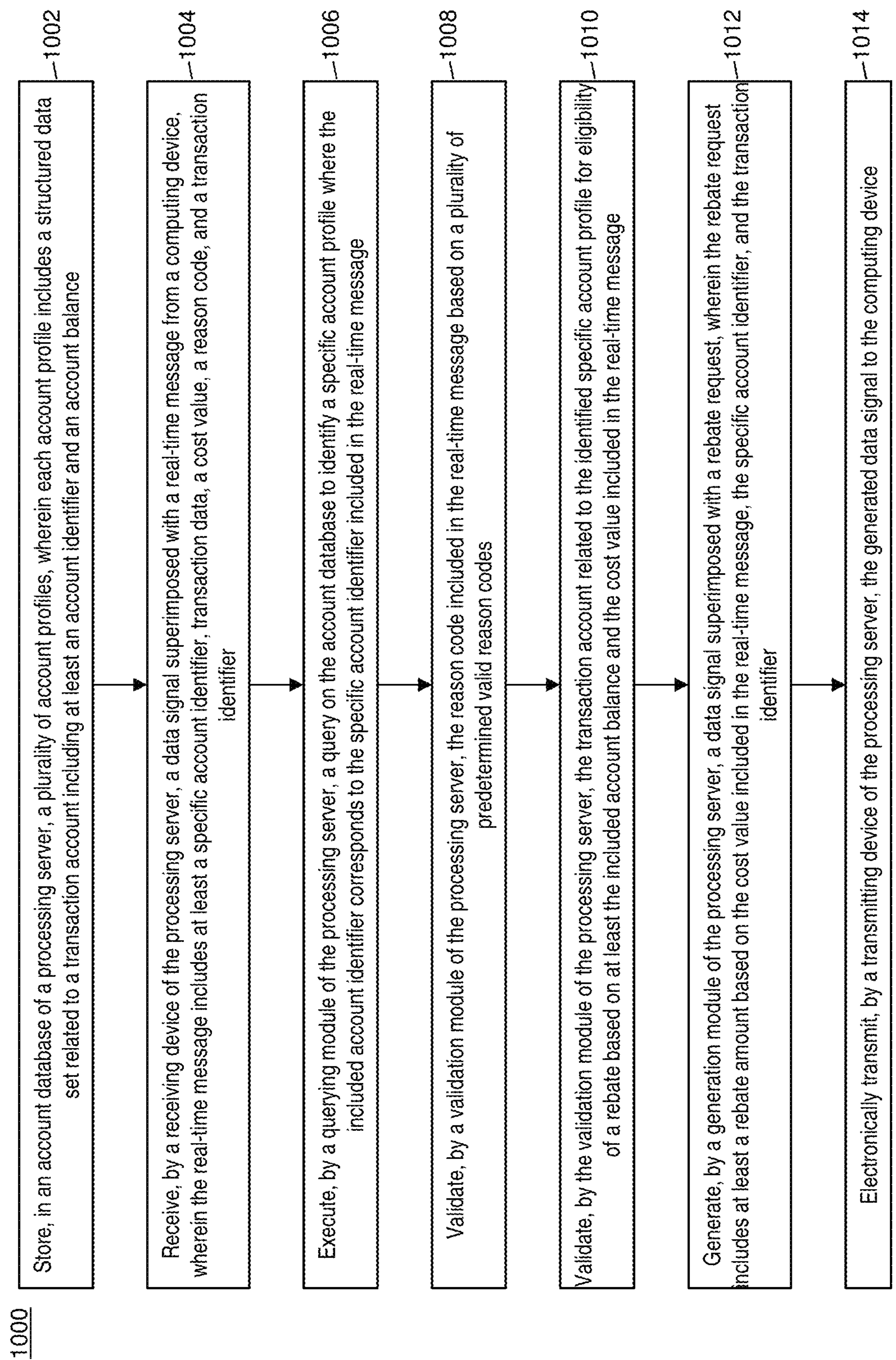
FIG. 10 is another flow chart illustrating the interaction between the payment network and the processing server of FIG. 1 for determining rebate eligibility of a transaction account in accordance with exemplary embodiments.

FIG. 10 is another flow chart 1000 illustrating the interaction between the payment network and the processing server of FIG. 1 for determining rebate eligibility of a transaction account in accordance with exemplary embodiments.

At 1002, processing server 102 may be configured to store account profiles 208 in account database 206. Each of account profiles 208 includes data associated with a transaction account generated for a cardholder, e.g., consumer 104. The data associated with the transaction account may be structured as a data set that at least includes an account identifier and an account balance.

At 1004, receiving device 202 may be configured to receive, from payment network 112 via an application programming interface, a data signal superimposed with a real-time message from an entity in payment network 112. The real time message may at least include a specific account identifier that identifies the account profile involved in the current payment transaction, transaction data, a cost value, a reason code, and a transaction identifier. The cost value may refer to the amount of rebates or points needed to complete the current payment transaction and may be determined based on a conversion rate associated with a transaction currency and a reward currency. For example, the conversion rate may indicate that the cardholder can redeem one dollar for every five points.

At 1006, upon receiving the real-time message, querying module 218 may be configured to execute a query on account database 206 to identify a specific account profile where the included account identifier corresponds to the specific account identifier in the real-time message.

At 1008, validation module 220 may be configured to validate the reason code included in the real-time message based on a plurality of predetermined valid reason codes.

For example, validation module 220 may be configured to compare the reason code included in the real-time message with the plurality of valid reason codes stored in memory 224. If the reason code included in the real-time message matches one of the stored valid reason codes, validation module 220 may determine the reason code in the real-time message indicates that the current payment transaction is eligible for applying rebates or points in the identified account profile.

At 1010, validation module 220 may be also configured to validate the transaction account related to the identified specific account profile for eligibility of a rebate based on at least the included account balance and the cost value included in the real-time message. That is, validation module 220 may be configured to compare the included account balance with the cost value included in the real-time message. If the account balance is greater than or equal to the cost value included in the real-time message, validation module 220 may be configured to determine that the identified specific account profile is eligible for reward usage.

At 1012, subsequent to validation module 220 determining the validity of the current payment transaction and the eligibility of the identified account, generation module 216 of processing server 102 may be configured to generate a data signal superimposed with a rebate request to request rebates or points to be applied to the current payment transaction. The rebate request may at least include a rebate amount based on the cost value included in the real-time message, the specific account identifier, and the transaction identifier.

At 1014, transmitting device 222 of the processing server 102 may then be configured to electronically transmit the generated data signal to the computing device 104A via the payment network 112.

Figure 11:
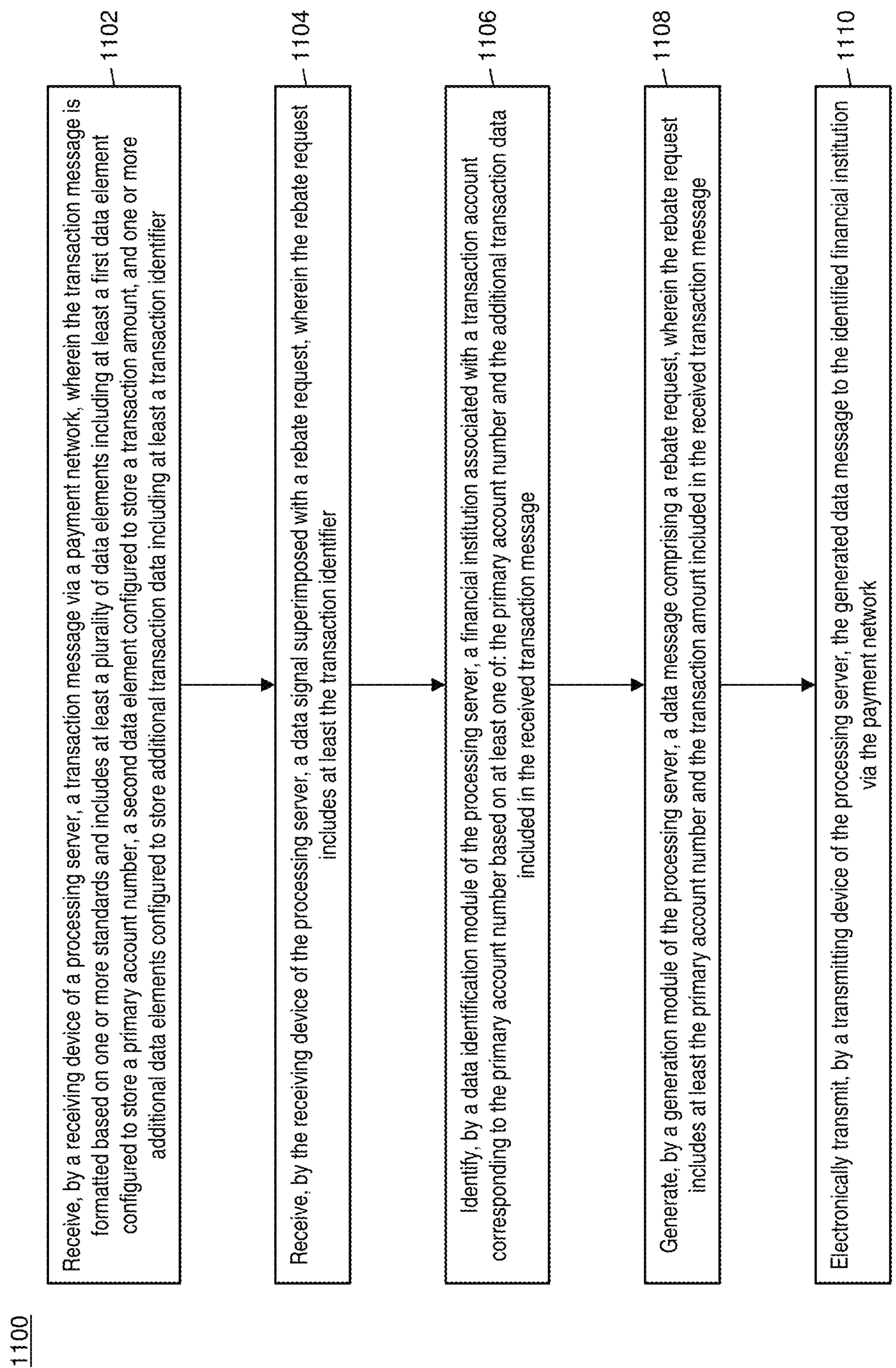
FIG. 11 is another flow chart illustrating the interaction between the consumer device, the processing server, and the issuer server of FIG. 1 for real-time processing of a rebate in accordance with exemplary embodiments.

FIG. 11 is another flow chart 1100 illustrating the interaction between the consumer device, the processing server, and the issuer server of FIG. 1 for real-time processing of a rebate in accordance with exemplary embodiments.

At 1102, receiving device 202 may receive a transaction message from acquirer server 110 via payment network 112. The transaction message may be formatted based on the one or more standards (e.g., ISO 8583) and may include a plurality of data elements including at least a first data element configured to store a primary account number, a second data element configured to store a transaction amount, and one or more additional data elements configured to store additional transaction data including at least a transaction identifier that identifies a current payment transaction.

At 1104, receiving device 202 may also receive a data signal superimposed with a rebate request, wherein the rebate request includes at least a transaction identifier that identifies the current payment transaction. Consumer device 104A may send the rebate request via a communication network to request previously-received rebates or points to be applied to the current payment transaction.

At 1106, data identification module 214 may be configured to identify a financial institution associated with a transaction account corresponding to the primary account number based on at least one of: the primary account number and the additional transaction data included in the received transaction message. That is, querying module 218 may first identify, from account profiles 208, a transaction account corresponding to the primary account number. Based on the identified transaction account, data identification module 214 may identify the financial institution associated with the transaction account, e.g., the issuer of the transaction account.

At 1108, generation module 216 of processing server 102 may be configured to generate a data message comprising the rebate request, wherein the rebate request includes at least the primary account number and the transaction amount included in the received transaction message.

At 1110, transmitting device 222 may then be configured to electronically transmit the generated data message to the identified financial institution via payment network 112 in real-time.

Figure 12:
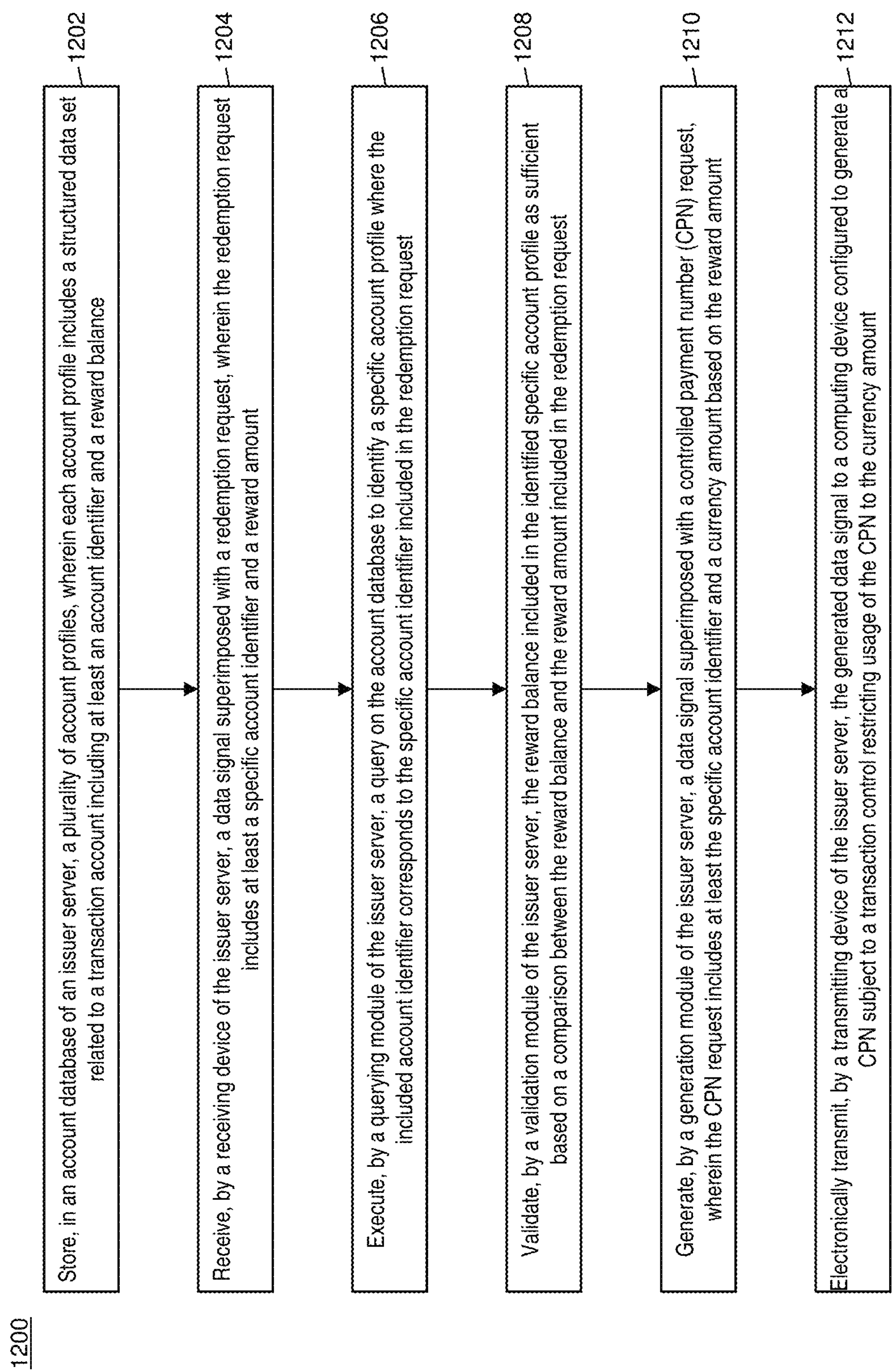
FIG. 12 is another flow chart illustrating the interaction between the consumer device, the issuer server, and the processing server of FIG. 1 for generating a controlled payment number using reward value in accordance with exemplary embodiments.

FIG. 12 is another flow chart 1200 illustrating the interaction between the consumer device, the issuer server, and the processing server of FIG. 1 for generating a controlled payment number using reward value in accordance with exemplary embodiments.

At 1202, issuer server 106 may be configured to store account profiles 208 in account database 206. Each of account profiles 208 includes data associated with a transaction account generated for a cardholder. The data associated with the transaction account may be structured as a data set that at least includes identification information of the transaction account (e.g., the transaction account number or identifier) and a reward balance.

At 1204, receiving device 202 of issuer server 106 may be configured to receive a data signal superimposed with a redemption request, wherein the redemption request includes at least a specific account identifier that identifies the consumer's 104 account and a reward amount that consumer 104 intends to redeem. Consumer device 104A may send the redemption request to issuer server 106 via a communication network.

At 1206, querying module 218 of issuer server 106 may be configured to execute a query on account database 206 of issuer server 106 to identify a specific account profile wherein the included account identifier corresponds to the specific account identifier included in the redemption request. That is, querying module 218 of issuer server 106 may identify the specific account profile that matches the specific account identifier in the redemption request.

At 1208, validation module 220 of issuer server 106 may be configured to validate the reward balance included in the identified specific account profile as sufficient based on a comparison between the reward balance and the reward amount included in the redemption request. If the reward balance is equal to or greater than the reward amount included in the redemption request, validation module 220 may determine that the reward balance is sufficient for the redemption request.

At 1210, if the reward balance is determined to be sufficient, i.e., validated, generation module 216 of issuer server 106 may be configured to generate a data signal superimposed with a controlled payment number (CPN) request. The CPN request may indicate that consumer 104 intends to redeem at least a portion of the available rebates or points and may at least include the specific account identifier and a currency amount generated based on the reward amount.

At 1212, transmitting device 222 of issuer server 106 may be configured to electronically transmit the generated data signal to a computing device (e.g., to processing server 102 via payment network 112) configured to generate a CPN subject to a transaction control restricting usage of the CPN to the currency amount.

Payment Transaction Processing System and Process

Figure 13:
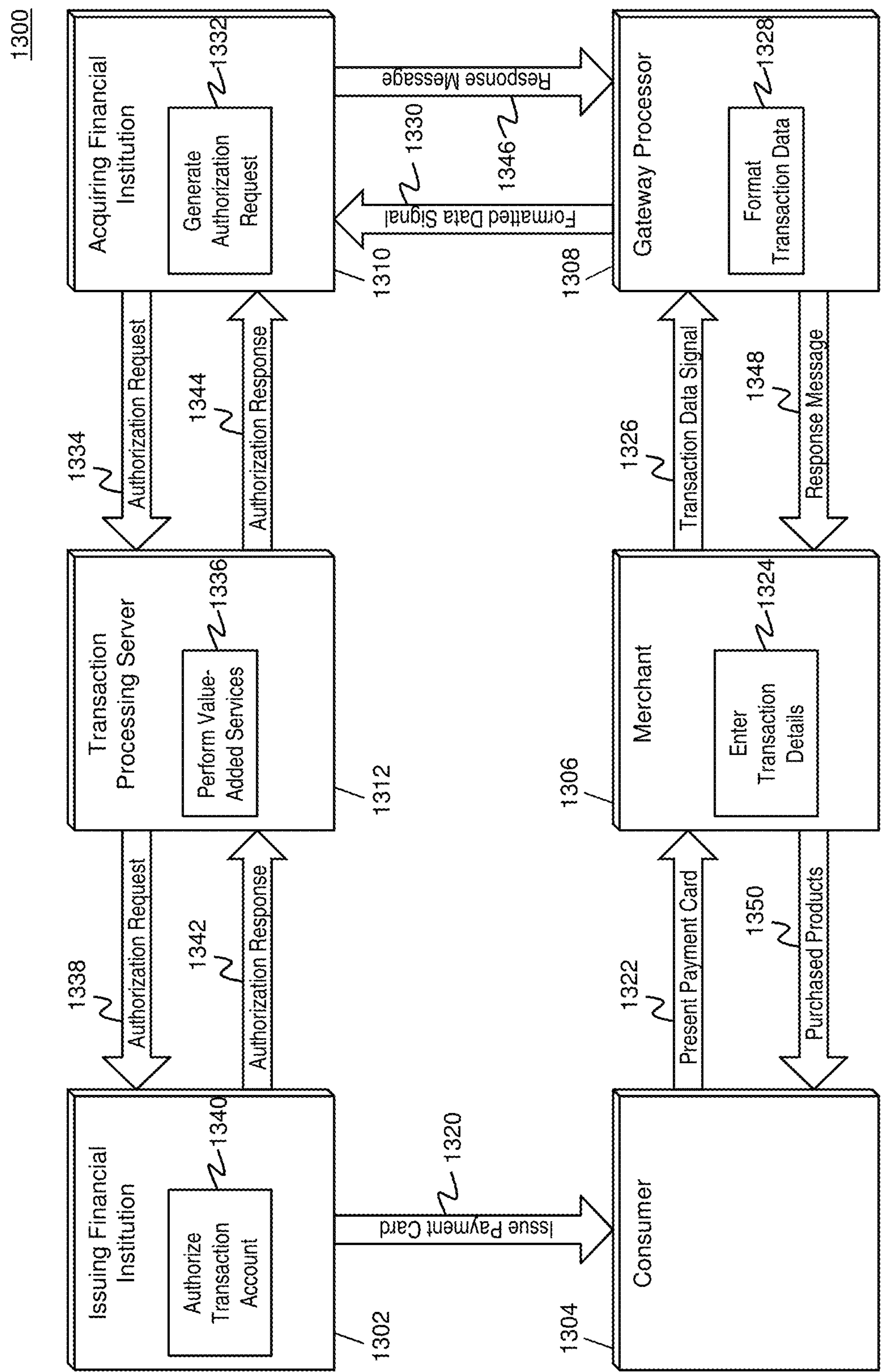
FIG. 13 is a flow diagram illustrating the processing of a payment transaction in accordance with exemplary embodiments.

FIG. 13 is a flow diagram 1300 illustrating the processing of a payment transaction in accordance with exemplary embodiments.

The process 1300 and steps included therein may be performed by one or more components of the system 100 discussed above, such as the processing server 102, merchant server 108, payment network 112, acquirer server 110, issuer server 106, etc. The processing of payment transactions using the system and process 1300 illustrated in FIG. 13 and discussed below may utilize the payment rails, which may be comprised of the computing devices and infrastructure utilized to perform the steps of the process 1300 as specially configured and programmed by the entities discussed below, including the transaction processing server 1312, which may be associated with one or more payment networks configured to processing payment transactions. It will be apparent to persons having skill in the relevant art that the process 1300 may be incorporated into the processes illustrated in FIGS. 3-12, discussed above, with respect to the step or steps involved in the processing of a payment transaction. In addition, the entities discussed herein for performing the process 1300 may include one or more computing devices or systems configured to perform the functions discussed below. For instance, the merchant 1306 may be comprised of one or more point of sale devices, a local communication network, a computing server, and other devices configured to perform the functions discussed below.

In step 1320, an issuing financial institution 1302 may issue a payment card or other suitable payment instrument to a consumer 1304. The issuing financial institution may be a financial institution, such as a bank, or other suitable type of entity that administers and manages payment accounts and/or payment instruments for use with payment accounts that can be used to fund payment transactions. The consumer 1304 may have a transaction account with the issuing financial institution 1302 for which the issued payment card is associated, such that, when used in a payment transaction, the payment transaction is funded by the associated transaction account. In some embodiments, the payment card may be issued to the consumer 1304 physically. In other embodiments, the payment card may be a virtual payment card or otherwise provisioned to the consumer 1304 in an electronic format.

In step 1322, the consumer 1304 may present the issued payment card to a merchant 1306 for use in funding a payment transaction. The merchant 1306 may be a business, another consumer, or any entity that may engage in a payment transaction with the consumer 1304. The payment card may be presented by the consumer 1304 via providing the physical card to the merchant 1306, electronically transmitting (e.g., via near field communication, wireless transmission, or other suitable electronic transmission type and protocol) payment details for the payment card, or initiating transmission of payment details to the merchant 1306 via a third party. The merchant 1306 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 1324, the merchant 1306 may enter transaction details into a point of sale computing system. The transaction details may include the payment details provided by the consumer 1304 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 1306 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 1306 may be an online retailer in an e-commerce transaction. In such embodiments, the transaction details may be entered in a shopping cart or other repository for storing transaction data in an electronic transaction as will be apparent to persons having skill in the relevant art.

In step 1326, the merchant 1306 may electronically transmit a data signal superimposed with transaction data to a gateway processor 1308. The gateway processor 1308 may be an entity configured to receive transaction details from a merchant 1306 for formatting and transmission to an acquiring financial institution 1310. In some instances, a gateway processor 1308 may be associated with a plurality of merchants 1306 and a plurality of acquiring financial institutions 1310. In such instances, the gateway processor 1308 may receive transaction details for a plurality of different transactions involving various merchants, which may be forwarded on to appropriate acquiring financial institutions 1310. By having relationships with multiple acquiring financial institutions 1310 and having the requisite infrastructure to communicate with financial institutions using the payment rails, such as using application programming interfaces associated with the gateway processor 1308 or financial institutions used for the submission, receipt, and retrieval of data, a gateway processor 1308 may act as an intermediary for a merchant 1306 to be able to conduct payment transactions via a single communication channel and format with the gateway processor 1308, without having to maintain relationships with multiple acquiring financial institutions 1310 and payment processors and the hardware associated thereto. Acquiring financial institutions 1310 may be financial institutions, such as banks, or other entities that administers and manages payment accounts and/or payment instruments for use with payment accounts. In some instances, acquiring financial institutions 1310 may manage transaction accounts for merchants 1306. In some cases, a single financial institution may operate as both an issuing financial institution 1302 and an acquiring financial institution 1310.

The data signal transmitted from the merchant 1306 to the gateway processor 1308 may be superimposed with the transaction details for the payment transaction, which may be formatted based on one or more standards. In some embodiments, the standards may be set forth by the gateway processor 1308, which may use a unique, proprietary format for the transmission of transaction data to/from the gateway processor 1308. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 1308.

In step 1328, the gateway processor 1308 may parse the transaction data signal to obtain the transaction data superimposed thereon and may format the transaction data as necessary. The formatting of the transaction data may be performed by the gateway processor 1308 based on the proprietary standards of the gateway processor 1308 or an acquiring financial institution 1310 associated with the payment transaction. The proprietary standards may specify the type of data included in the transaction data and the format for storage and transmission of the data. The acquiring financial institution 1310 may be identified by the gateway processor 1308 using the transaction data, such as by parsing the transaction data (e.g., deconstructing into data elements) to obtain an account identifier included therein associated with the acquiring financial institution 1310. In some instances, the gateway processor 1308 may then format the transaction data based on the identified acquiring financial institution 1310, such as to comply with standards of formatting specified by the acquiring financial institution 1310. In some embodiments, the identified acquiring financial institution 1310 may be associated with the merchant 1306 involved in the payment transaction, and, in some cases, may manage a transaction account associated with the merchant 1306.

In step 1330, the gateway processor 1308 may electronically transmit a data signal superimposed with the formatted transaction data to the identified acquiring financial institution 1310. The acquiring financial institution 1310 may receive the data signal and parse the signal to obtain the formatted transaction data superimposed thereon. In step 1332, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 1306 involved in the payment transaction is requesting payment or a promise of payment from the issuing financial institution 1302 for the transaction. The authorization request may include a plurality of data elements, each data element being configured to store data as set forth in the associated standards, such as for storing an account number, application cryptogram, transaction amount, issuing financial institution 1302 information, etc.

In step 1334, the acquiring financial institution 1310 may electronically transmit the authorization request to a transaction processing server 1312 for processing. The transaction processing server 1312 may be comprised of one or more computing devices as part of a payment network configured to process payment transactions. In some embodiments, the authorization request may be transmitted by a transaction processor at the acquiring financial institution 1310 or other entity associated with the acquiring financial institution. The transaction processor may be one or more computing devices that include a plurality of communication channels for communication with the transaction processing server 1312 for the transmission of transaction messages and other data to and from the transaction processing server 1312. In some embodiments, the payment network associated with the transaction processing server 1312 may own or operate each transaction processor such that the payment network may maintain control over the communication of transaction messages to and from the transaction processing server 1312 for network and informational security.

In step 1336, the transaction processing server 1312 may perform value-added services for the payment transaction. Value-added services may be services specified by the issuing financial institution 1302 that may provide additional value to the issuing financial institution 1302 or the consumer 1304 in the processing of payment transactions. Value-added services may include, for example, fraud scoring, transaction or account controls, account number mapping, offer redemption, loyalty processing, etc. For instance, when the transaction processing server 1312 receives the transaction, a fraud score for the transaction may be calculated based on the data included therein and one or more fraud scoring algorithms and/or engines. In some instances, the transaction processing server 1312 may first identify the issuing financial institution 1302 associated with the transaction, and then identify any services indicated by the issuing financial institution 1302 to be performed. The issuing financial institution 1302 may be identified, for example, by data included in a specific data element included in the authorization request, such as an issuer identification number. In another example, the issuing financial institution 1302 may be identified by the primary account number stored in the authorization request, such as by using a portion of the primary account number (e.g., a bank identification number) for identification.

In step 1338, the transaction processing server 1312 may electronically transmit the authorization request to the issuing financial institution 1302. In some instances, the authorization request may be modified, or additional data included in or transmitted accompanying the authorization request as a result of the performance of value-added services by the transaction processing server 1312. In some embodiments, the authorization request may be transmitted to a transaction processor (e.g., owned or operated by the transaction processing server 1312) situated at the issuing financial institution 1302 or an entity associated thereof, which may forward the authorization request to the issuing financial institution 1302.

In step 1340, the issuing financial institution 1302 may authorize the transaction account for payment of the payment transaction. The authorization may be based on an available credit amount for the transaction account and the transaction amount for the payment transaction, fraud scores provided by the transaction processing server 1312, and other considerations that will be apparent to persons having skill in the relevant art. The issuing financial institution 1302 may modify the authorization request to include a response code indicating approval (e.g., or denial if the transaction is to be denied) of the payment transaction. The issuing financial institution 1302 may also modify a message type indicator for the transaction message to indicate that the transaction message is changed to be an authorization response. In step 1342, the issuing financial institution 1302 may transmit (e.g., via a transaction processor) the authorization response to the transaction processing server 1312.

In step 1344, the transaction processing server 1312 may forward the authorization response to the acquiring financial institution 1310 (e.g., via a transaction processor). In step 1346, the acquiring financial institution may generate a response message indicating approval or denial of the payment transaction as indicated in the response code of the authorization response, and may transmit the response message to the gateway processor 1308 using the standards and protocols set forth by the gateway processor 1308. In step 1348, the gateway processor 1308 may forward the response message to the merchant 1306 using the appropriate standards and protocols. In step 1350, assuming the transaction was approved, the merchant 1306 may then provide the products purchased by the consumer 1304 as part of the payment transaction to the consumer 1304.

In some embodiments, once the process 1300 has completed, payment from the issuing financial institution 1302 to the acquiring financial institution 1310 may be performed. In some instances, the payment may be made immediately or within one business day. In other instances, the payment may be made after a period of time, and in response to the submission of a clearing request from the acquiring financial institution 1310 to the issuing financial institution 1302 via the transaction processing server 1302. In such instances, clearing requests for multiple payment transactions may be aggregated into a single clearing request, which may be used by the transaction processing server 1312 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 1340), the transaction processing server 1312 may be configured to perform authorization of transactions on behalf of the issuing financial institution 1302. Such actions may be referred to as "stand-in processing," where the transaction processing server "stands in" as the issuing financial institution 1302. In such instances, the transaction processing server 1312 may utilize rules set forth by the issuing financial institution 1302 to determine approval or denial of the payment transaction, and may modify the transaction message accordingly prior to forwarding to the acquiring financial institution 1310 in step 1344. The transaction processing server 1312 may retain data associated with transactions for which the transaction processing server 1312 stands in, and may transmit the retained data to the issuing financial institution 1302 once communication is reestablished. The issuing financial institution 1302 may then process transaction accounts accordingly to accommodate for the time of lost communication.

In another example, if the transaction processing server 1312 is unavailable for submission of the authorization request by the acquiring financial institution 1310, then the transaction processor at the acquiring financial institution 1310 may be configured to perform the processing of the transaction processing server 1312 and the issuing financial institution 1302. The transaction processor may include rules and data suitable for use in making a determination of approval or denial of the payment transaction based on the data included therein. For instance, the issuing financial institution 1302 and/or transaction processing server 1312 may set limits on transaction type, transaction amount, etc. that may be stored in the transaction processor and used to determine approval or denial of a payment transaction based thereon. In such instances, the acquiring financial institution 1310 may receive an authorization response for the payment transaction even if the transaction processing server 1312 is unavailable, ensuring that transactions are processed and no downtime is experienced even in instances where communication is unavailable. In such cases, the transaction processor may store transaction details for the payment transactions, which may be transmitted to the transaction processing server 1312 (e.g., and from there to the associated issuing financial institutions 1302) once communication is reestablished.

In some embodiments, transaction processors may be configured to include a plurality of different communication channels, which may utilize multiple communication cards and/or devices, to communicate with the transaction processing server 1312 for the sending and receiving of transaction messages. For example, a transaction processor may be comprised of multiple computing devices, each having multiple communication ports that are connected to the transaction processing server 1312. In such embodiments, the transaction processor may cycle through the communication channels when transmitting transaction messages to the transaction processing server 1312, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 1310 may identify that an authorization request involves an issuing financial institution 1302 (e.g., via the bank identification number included in the transaction message) for which no value-added services are required. The transaction processor at the acquiring financial institution 1310 may then transmit the authorization request directly to the transaction processor at the issuing financial institution 1302 (e.g., without the authorization request passing through the transaction processing server 1312), where the issuing financial institution 1302 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 1312 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 1308, acquiring financial institution 1310, etc.) for processing using this advanced network, and to quickly and efficiently receive a response regarding the ability for a consumer 1304 to fund the payment transaction.

Computer System Architecture

Figure 14:
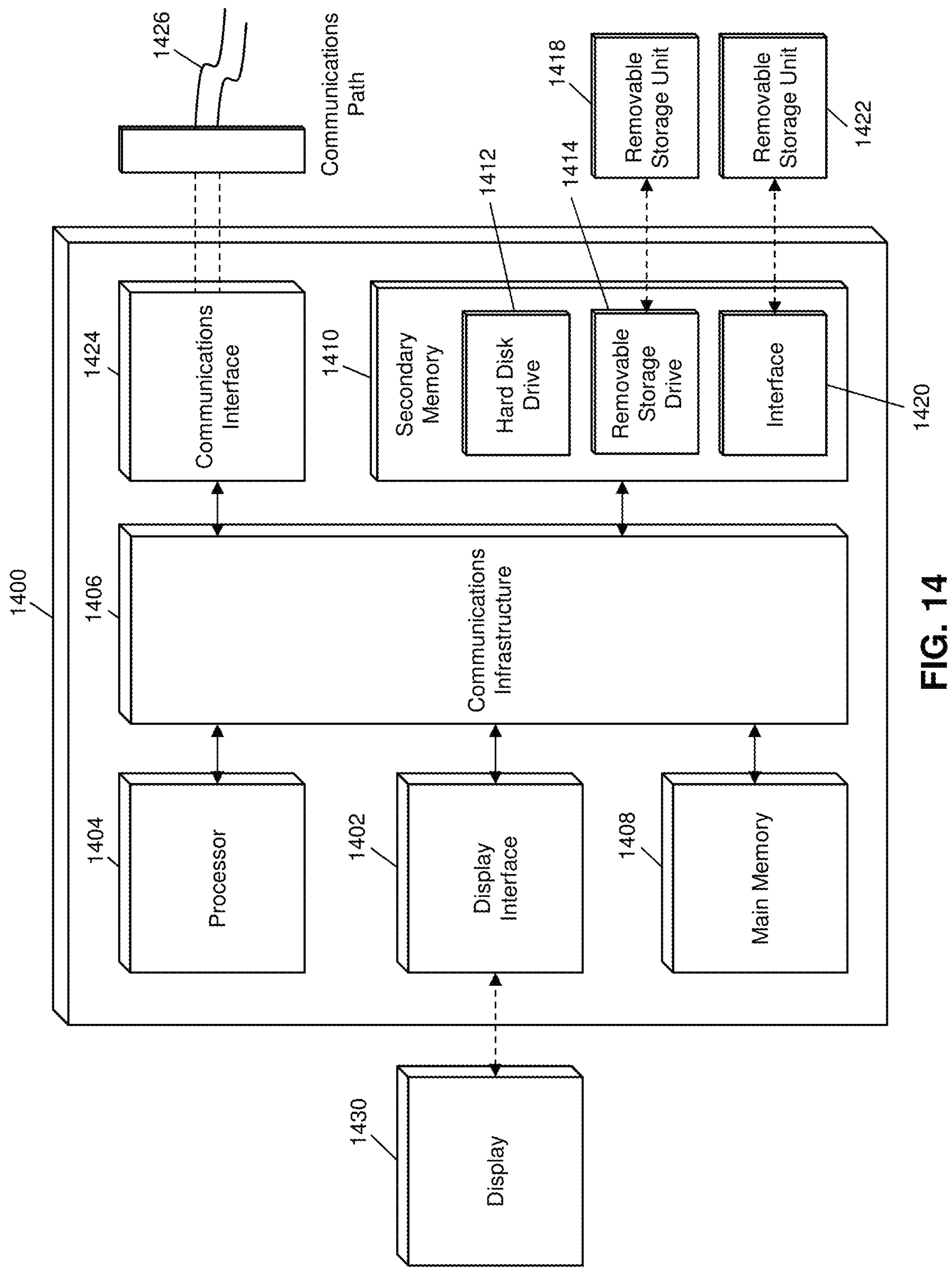
FIG. 14 is a block diagram illustrating computer system architecture in accordance with exemplary embodiments.

FIG. 14 is a block diagram illustrating a computer system architecture 1400 in accordance with exemplary embodiments.

For example, the processing server 102 of FIG. 1 may be implemented in the computer system 1400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-12.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1418, a removable storage unit 1422, and a hard disk installed in hard disk drive 1412.

Various embodiments of the present disclosure are described in terms of this example computer system 1400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1404 may be a special purpose or a general purpose processor device specifically configured to perform the functions discussed herein. The processor device 1404 may be connected to a communications infrastructure 1406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1400 may also include a main memory 1408 (e.g., random access memory, read-only memory, etc.), and may also include a secondary memory 1410. The secondary memory 1410 may include the hard disk drive 1412 and a removable storage drive 1414, such as a floppy disk drive, a magnetic tape drive, an optical disk drive, a flash memory, etc.

The removable storage drive 1414 may read from and/or write to the removable storage unit 1418 in a well-known manner. The removable storage unit 1418 may include a removable storage media that may be read by and written to by the removable storage drive 1414. For example, if the removable storage drive 1414 is a floppy disk drive or universal serial bus port, the removable storage unit 1418 may be a floppy disk or portable flash drive, respectively. In one embodiment, the removable storage unit 1418 may be non-transitory computer readable recording media.

In some embodiments, the secondary memory 1410 may include alternative means for allowing computer programs or other instructions to be loaded into the computer system 1400, for example, the removable storage unit 1422 and an interface 1420. Examples of such means may include a program cartridge and cartridge interface (e.g., as found in video game systems), a removable memory chip (e.g., EEPROM, PROM, etc.) and associated socket, and other removable storage units 1422 and interfaces 1420 as will be apparent to persons having skill in the relevant art.

Data stored in the computer system 1400 (e.g., in the main memory 1408 and/or the secondary memory 1410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1400 may also include a communications interface 1424. The communications interface 1424 may be configured to allow software and data to be transferred between the computer system 1400 and external devices. Exemplary communications interfaces 1424 may include a modem, a network interface (e.g., an Ethernet card), a communications port, a PCMCIA slot and card, etc. Software and data transferred via the communications interface 1424 may be in the form of signals, which may be electronic, electromagnetic, optical, or other signals as will be apparent to persons having skill in the relevant art. The signals may travel via a communications path 1426, which may be configured to carry the signals and may be implemented using wire, cable, fiber optics, a phone line, a cellular phone link, a radio frequency link, etc.

The computer system 1400 may further include a display interface 1402. The display interface 1402 may be configured to allow data to be transferred between the computer system 1400 and external display 1430. Exemplary display interfaces 1402 may include high-definition multimedia interface (HDMI), digital visual interface (DVI), video graphics array (VGA), etc. The display 1430 may be any suitable type of display for displaying data transmitted via the display interface 1402 of the computer system 1400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1408 and secondary memory 1410, which may be memory semiconductors (e.g., DRAMs, etc.). These computer program products may be means for providing software to the computer system 1400. Computer programs (e.g., computer control logic) may be stored in the main memory 1408 and/or the secondary memory 1410. Computer programs may also be received via the communications interface 1424. Such computer programs, when executed, may enable computer system 1400 to implement the present methods as discussed herein. In particular, the computer programs, when executed, may enable processor device 1404 to implement the methods illustrated by FIGS. 3-12, as discussed herein. Accordingly, such computer programs may represent controllers of the computer system 1400. Where the present disclosure is implemented using software, the software may be stored in a computer program product and loaded into the computer system 1400 using the removable storage drive 1414, interface 1420, and hard disk drive 1412, or communications interface 1424.

The processor device 1404 may comprise one or more modules or engines configured to perform the functions of the computer system 1400. Each of the modules or engines may be implemented using hardware and, in some instances, may also utilize software, such as corresponding to program code and/or programs stored in the main memory 1408 or secondary memory 1410. In such instances, program code may be compiled by the processor device 1404 (e.g., by a compiling module or engine) prior to execution by the hardware of the computer system 1400. For example, the program code may be source code written in a programming language that is translated into a lower level language, such as assembly language or machine code, for execution by the processor device 1404 and/or any additional hardware components of the computer system 1400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1400 to perform the functions disclosed herein. It will be apparent to persons having skill in the relevant art that such processes result in the computer system 1400 being a specially configured computer system 1400 uniquely programmed to perform the functions discussed above.

Techniques consistent with the present disclosure provide, among other features, systems and methods for generating and using indexing models for neighborhood growth. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for real-time processing of a rebate, comprising:

receiving, by a receiving device of a processing server, from an acquirer server, via specialized infrastructure of a payment network, a transaction message associated with a currently pending transaction, wherein the transaction message includes at least a first data element storing a primary account number, a second data element storing a transaction amount, and one or more additional data elements storing additional transaction data including at least a transaction identifier that uniquely identifies the transaction message;

concurrent with the processing of the currently pending transaction at an issuer server, receiving, by the receiving device of the processing server, a data signal superimposed with a rebate redemption request, directly from an interface of a consumer device, wherein (i) the processing server and the issuer server are separate and distinct entities and are configured to independently and directly communicate with the consumer device, (ii) the issuer server, while processing the currently pending transaction, and before the processing server receives the rebate redemption request, directly transmits a transaction notification to a consumer of the consumer device notifying the consumer that the currently pending transaction is being processed, and (iii) the rebate redemption request, received from the consumer device, requests that previously received rebates or points be applied to the currently pending transaction concurrently being processed at the issuer server, and includes at least the transaction identifier that uniquely identifies the transaction message;

generating, by a generation module of the processing server, a data message comprising a rebate request, wherein the rebate request includes at least the primary account number and the transaction amount included in the received transaction message;

electronically transmitting, by a transmitting device of the processing server, the generated data message to the issuing server via the payment network, and receiving, by the issuing server, the generated data message transmitted by the processing server and, in response to receiving said generated data message, applying previously received rebates or points to the currently pending transaction.

2. The method of claim 1, wherein the generated data message is electronically transmitted in real-time following receipt of the data signal superimposed with the rebate redemption request.

3. The method of claim 1, wherein the generated data message does not include any additional rebate requests.

4. The method of claim 1, further comprising:

storing, in an account database of the processing server, a plurality of account profiles, wherein each account profile includes a structured data set related to a transaction account including at least an account number; and executing, by a querying module of the processing server, a query on the account database to identify a specific account profile where the included account number corresponds to the primary account number stored in the first data element included in the received transaction message.

5. The method of claim 4, wherein each account profile further includes a reward value, and the method further comprises:

validating, by a validation module of the processing server, eligibility for a rebate for the payment transaction based on at least a correspondence between the reward value included in the identified specific account profile and the transaction amount stored in the second data element included in the received transaction message.

6. The method of claim 5, further comprising:

executing, by the querying module of the processing server, a query on the account database to update the reward value included in the specific account profile based on the transaction amount stored in the second data element included in the received transaction message.

7. The method of claim 4, wherein each account profile further includes a device identifier, and the consumer device is associated with the device identifier included in the identified specific account profile.

8. The method of claim 1, wherein the data signal comprising the rebate redemption request is received via a communication network.

9. The method of claim 1, wherein the transaction identifier is an identification number.

10. The method of claim 1, wherein the transaction identifier is a unique combination including at least one of: a merchant identifier, a transaction time, a transaction date, and a geographic location.

11. A system for real-time processing of a rebate, comprising:
a processing server;
a consumer device; and
an issuer server,
wherein
a receiving device, of the processing server, is configured to
(i) receive a transaction message, from an acquirer server, via specialized infrastructure of a payment network, wherein the transaction message is associated with a currently pending transaction and includes a first data element storing a primary account number, a second data element storing a transaction amount, and one or more additional data elements storing additional transaction data including at least a transaction identifier that uniquely identifies the transaction message, and
(ii) concurrent with the processing of the currently pending transaction at an issuer server, receive, directly from an interface of a consumer device, a data signal superimposed with a rebate redemption request, wherein
(a) the processing server and the issuer server are separate and distinct entities and are configured to independently and directly communicate with the consumer device,
(b) the issuer server, while processing the currently pending transaction, and before the processing server receives the rebate redemption request, directly transmits a transaction notification to a consumer of the consumer device notifying the consumer that the currently pending transaction is being processed, and
(c) the rebate redemption request, received from the consumer device, requests that previously received rebates or points be applied to the currently pending transaction being processing at the issuer server, and includes at least the transaction identifier that uniquely identifies the transaction message;
a generation module, of the processing server, configured to generate a data message comprising a rebate request, wherein the data message further includes at least the primary account number and the transaction amount included in the received transaction message; and
a transmitting device, of the processing server, configured to electronically transmit the generated data message to the issuing server via the payment network, and
a receiving device, of the issuing server, is configured to receive the generated data message transmitted from the processing server, and
wherein, in response to receiving said generated data message, the issuing server is configured to apply previously received rebates or points to the currently pending transaction.

12. The system of claim 11, wherein the generated data message is electronically transmitted in real-time following receipt of the data signal superimposed with the rebate redemption request.

13. The system of claim 11, wherein the generated data message does not include any additional rebate requests.

14. The system of claim 11, further comprising:
an account database of the processing server configured to store a plurality of account profiles, wherein each account profile includes a structured data set related to a transaction account including at least an account number; and
a querying module of the processing server configured to execute a query on the account database to identify a specific account profile where the included account number corresponds to the primary account number stored in the first data element included in the received transaction message.

15. The system of claim 14, wherein each account profile further includes a reward value, and the system further comprises:
a validation module of the processing server configured to validate eligibility for a rebate for the payment transaction based on at least a correspondence between the reward value included in the identified specific account profile and the transaction amount stored in the second data element included in the received transaction message.

16. The system of claim 15, wherein the querying module of the processing server is further configured to execute a query on the account database to update the reward value included in the specific account profile based on the transaction amount stored in the second data element included in the received transaction message.

17. The system of claim 14, wherein each account profile further includes a device identifier, and the consumer device is associated with the device identifier included in the identified specific account profile.

18. The system of claim 11, wherein the data signal comprising the rebate redemption request is received via a communication network.

19. The system of claim 11, wherein the transaction identifier is an identification number.

20. The system of claim 11, wherein the transaction identifier is a unique combination including at least one of: a merchant identifier, a transaction time, a transaction date, and a geographic location.

* * * * *